United States Patent [19]
Watanabe

[11] Patent Number: 5,615,040
[45] Date of Patent: Mar. 25, 1997

[54] SELF-RESPONDING LAMINATED BODIES, THEIR PRODUCTION PROCESS AND WINDOWS USING THE SAME

[75] Inventor: Haruo Watanabe, Tokyo, Japan

[73] Assignee: Affinity Co., Ltd., Tokyo, Japan

[21] Appl. No.: 325,385

[22] PCT Filed: Feb. 28, 1994

[86] PCT No.: PCT/JP94/00325

§ 371 Date: Oct. 26, 1994

§ 102(e) Date: Oct. 26, 1994

[87] PCT Pub. No.: WO94/20294

PCT Pub. Date: Sep. 15, 1994

[30] Foreign Application Priority Data

Mar. 1, 1993 [JP] Japan .................................. 5-062502

[51] Int. Cl.⁶ .................................................... H04N 1/17
[52] U.S. Cl. ...................... 359/288; 359/289; 349/169; 349/182
[58] Field of Search ............................ 359/288, 289, 359/103, 99

[56] References Cited

U.S. PATENT DOCUMENTS

| 4,132,464 | 1/1979 | Maeno | 350/351 |
| 4,169,661 | 10/1979 | Yamada et al. | 350/353 |

FOREIGN PATENT DOCUMENTS

| 86102129 | 2/1986 | European Pat. Off. |
| 7821641 | 7/1978 | France. |
| 2331414.9 | 6/1973 | Germany. |
| 1145060 | 3/1969 | United Kingdom. |

OTHER PUBLICATIONS

Patent Abstracts of Japan vol. 11 No.4 (E–468), Jan. 7, 1987 & JP-A-61 179535 (Matsushita Electric Ind. Co.).
Database WPI, week 8008, Derwent Publications Ltd., London, GB, An 80–13702c, Jan. 12, 1980 & JP-A-55 003 953 (Ishii H).

*Primary Examiner*—Edward J. Cain
*Attorney, Agent, or Firm*—Paul & Paul

[57] ABSTRACT

The present invention describes a self-responding laminated body in which an isotropic solution, wherein a polysaccharide derivative, dissolved in water, aggregates to demonstrate cloudy scattering due to a rise in temperature resulting in a decrease in optical transmittance, is sealed in a cell, of which at least a portion is transparent, that enables the aqueous solution to be viewed directly; wherein, the isotropic aqueous solution is a solution in which 100 parts by weight of a polysaccharide derivative, having a weight average molecular weight of roughly 10,000 to roughly 200,000, is dissolved in roughly 110 to roughly 2,000 parts by weight of a water-based medium composed of an amount of water that is roughly 25 to roughly 450 parts by weight with respect to 100 parts by weight of the polysaccharide derivative, and an amphipathic substance. This laminated body can be produced by sealing the isotropic aqueous solution in a cell having at least one transparent portion that enables the aqueous solution to be viewed directly, and can be advantageously used as a window.

40 Claims, 5 Drawing Sheets

5,615,040

SELF-RESPONDING LAMINATED BODIES, THEIR PRODUCTION PROCESS AND WINDOWS USING THE SAME

TECHNICAL FIELD

The present invention relates to a laminated body, its production and its use, which becomes cloudy and blocks light due to the action of heat resulting from absorption of light when irradiated with light. The present invention can be realized in buildings, automobiles and so forth having windows in which only the surface that is directly irradiated with light selectively blocks light. In addition, it can also be used in partitions, doors and so forth equipped with electronic curtains by combining it with a heating element.

BACKGROUND ART

In recent years, light regulating glass that reversibly controls light by physicochemical means using compound glass incorporating functional materials has been proposed as an alternative to mechanical methods. Examples of such glass include liquid crystal, electrochromic, fine particle polarized orientation, photochromic and thermochromic types. In addition, heat absorbing glass and heat reflecting glass and so forth have come to be used in windows to prevent the entry of solar energy into living space. However, although heat absorbing glass and heat reflecting glass certainly prevent the entry of solar energy into living space, this glass leaves residual coloring and surface glare, thus having the disadvantage of losing the inherent advantages of glass in terms of being colorless and transparent. Moreover, in terms of energy conservation as well, control of visible light, which has roughly half of the energy of sunlight, is inadequate. Furthermore, as is described in detail in the research report of the 1991 Survey of Countermeasures of the New Glass Industry of the New Glass Forum (Measures for Preventing Global Warming), the use of light regulating glass is related to energy conservation policies, and there are strong expectations with respect to its future development.

The inventors of the present invention therefore focused their attention on solar energy irradiated onto windows. A comfortable living space could be obtained if window glass would cause a reversible change between transparency and opacity by automatically responding to the presence or absence of this energy. This self-responding quality is extremely appealing not only in terms of the characteristic of blocking out light from only the irradiated surface and its effect on energy conservation, but also with respect to installation, maintenance and upkeep costs. Although photochromic and thermochromic types could also be selected from this viewpoint, in contrast to the mechanism of action of photochromic types being complex and dependent on wavelength, thermochromic types are superior since they are dependent on thermal action only, thereby enabling temperature to be easily adjusted artificially as necessary. Furthermore, it should be noted that the wavelengths of solar energy that reaches the earth are within the range of 290–2140 nm, light within the range of visible light to near infrared light at a wavelength of 400–1100 nm accounts for roughly 80% of that energy, and the region of visible light is larger than that of near infrared light. This indicates that controlling sunlight in the region of visible light is important not only for screening the eyes, but also in terms of energy conservation and glare shielding effects. Furthermore, the present invention attempts to utilize the fact that, When an object is irradiated by light, that light is absorbed and converted into heat which causes the temperature of the object to rise due to that heat. In addition, the present invention may also be used by artificially controlling temperature with a heating element.

As indicated in the above-mentioned references and U.S. Pat. Nos. 4,132,464 and 4,169,661, the properties of the materials used in thermochromic types of light regulating glass are inadequate, and have yet to be put into practical use. It is therefore necessary to satisfy the following conditions for thermochromic glass to be used on a broad basis.
1. The phase change between transparency and opacity must be reversible.
2. The reversible changes must be able to be repeated without phase separation.
3. The temperature at which phase transition begins must be low.
4. The glass must be colorless or the color of the glass must not change.
5. The glass must be durable.
6. The materials must not be toxic or cause environmental pollution.

The inventors of the present invention focused their attention on an aqueous solution that undergoes phase transition from a colorless, transparent state to a cloudy, opaque state caused by a rise in temperature of the aqueous solution as a self-responding material having the potential to satisfy these conditions. In addition, the present invention is also advantageous from the point of being fail-safe since it is transparent in the normal state, and becomes cloudy to block out light following the application of energy.

In the past, the cloud point phenomenon of non-ionic surface activators was widely known as an example of an aqueous solution that changes to a cloudy, opaque state due to temperature rise, and studies have been conducted using this as a thermochromic material. However, it goes without saying that this material is easily susceptible to phase separation, thus preventing it from satisfying conditions 1 and 2 described above. In addition, there are also certain isotropic aqueous solutions of non-ionic water-soluble polymers that become cloudy, and similar studies have also been conducted on these materials. However, these materials have also not been developed practically since these too are unable to satisfy the above-mentioned conditions 1 and 2. Although water-soluble polymer solutions are in the form of colorless, transparent aqueous solutions at room temperature, if left as is after having changed to a cloudy, opaque state following heating, phase separation and lack of uniformity of the aqueous solution occur. As a result, these solutions were unable to maintain their uniformity and permit repeated reversible changes. Moreover, when a laminated body was formed using this aqueous solution and allowed to stand vertically, the cloudy aggregate easily precipitated and separated due to the difference in specific gravity, thus preventing it from being used. Although it was particularly necessary to control the temperature at which clouding begins in order to enable practical use, this phenomenon became more remarkable when inorganic electrolyte was added. This is the result of the presence of ions causing the bonded water to be broken down and strengthening the hydrophobic bonds of water-soluble polymers resulting in greater bonding strength. In addition, when the concentration of water-soluble polymer was increased to effectively block out direct light, precipitation and separation also occurred easily due to aggregation. When the thickness of the low-concentration aqueous solution layer is increased to improve blocking of light, there are problems consisting of the occurrence of differences in convection current due to differences in temperature and the occurrence of contamination due to the splattering of low viscosity liquid during breakage.

However, the inventors of the present invention noticed that water-soluble polymers, and particularly aqueous solutions of polysaccharide derivatives having hydroxypropyl groups, Which exhibit a favorable balance of hydrophobic and hydrophilic properties, are able to adequately block out direct sunlight even when in the form of a thin film. The inventors of the present invention therefore focused their attention on a water-soluble polymer having a polysaccharide for its main chain and hydroxypropyl groups on its side chain. Hydroxypropylcellulose, which has structurally stable cellulose for its main chain, was initially selected as a representative example of such a compound, and detailed studies were conducted on its aqueous solutions.

As is already known, aqueous solutions having a concentration of 50 parts by weight or more of hydroxypropylcellulose demonstrate properties characteristic of cholesteric liquid crystal in the form of a lyotropic-type polymer cholesteric liquid crystal. This liquid crystal exhibits polar colored, spectral interference colors dependent on the angle of view caused by selective scattering of visible light. In addition, although the transition temperature shifts according to molecular weight, concentration, amount of electrolyte added and so forth, this liquid crystal demonstrates a reversible change, becoming opaque above a certain temperature. Additional studies were therefore conducted to determine whether this liquid crystal satisfied the four conditions mentioned above. The selective scattering wavelength of this liquid crystal demonstrates a red shift due to decreases in concentration of increases in temperature. Therefore, although contrivances were made such that the condition of colorlessness would be satisfied when the concentration was lowered to a concentration at which near infrared light was selectively scattered at roughly 20° C. (for example, 56% by weight), selective scattering of red light was observed when viewed from an angle and when the temperature was roughly 10° C., thus preventing the liquid crystal from satisfying this condition. Since this occurrence of changes in color depending on the viewing angle and temperature inhibits the degree of freedom of design in the design of buildings, automobiles and so forth, it is essentially impossible to use such a material practically. .Although the inventors of the present invention then attempted to further lower the concentration of the aqueous solution (for example, 52% by weight), the result was two different phases consisting of the liquid crystal phase and an isotropic phase. The liquid crystal demonstrated pale white scattering of light causing transparency to be remarkably impaired and preventing this liquid crystal from being used. Although these phenomena were due in part to molecular weight, they were observed in similar fashion in all cases. In addition, even when in the transparent state in which near infrared light is selectively scattered as viewed at a right angle, or in other words, from the front, there still was hazing caused by scattering and unevenness characteristic of the liquid crystal composition. Namely, a single domain state was not able to obtained over a large surface area, thus preventing the obtaining of transparency like that of glass. In addition, once the liquid crystal became frozen, unevenness of linear defects occurred in the cholesteric phase even after the liquid crystal was returned to room temperature.

In order to be able to use the liquid crystal in a wide range of applications such as buildings and automobiles over a large surface area in the manner of conventional glass, it is extremely important to be able to obtain the inherent transparency of glass without any dependency on angle of view. As a result of earnest studies on the part of the inventors of the present invention based on reexamination of isotropic aqueous solutions of polysaccharide derivatives that do not demonstrate dependency on angle of view while in the transparent or opaque states, it was found that reversible changes of isotropic aqueous solutions can be repeated without occurrence of phase separation, thus eliminating those defects that had remained as basic problems and heretofore prevented practical application.

DISCLOSURE OF THE INVENTION

Thus, the object of the present invention is to provide a laminated body, its production process and a window that uses such, which is able to stably, repeatedly and reversibly change between a transparent state and an opaque state without dependency on angle of view according to a change in temperature by using an isotropic aqueous solution of a polysaccharide derivative.

In order to achieve the above-mentioned object, the present invention provides a self-responding laminated body in which an isotropic solution, wherein a polysaccharide derivative, dissolved in water, aggregates to demonstrate cloudy scattering due to a rise in temperature resulting in a decrease in optical transmittance, is sealed in a cell, of which at least a portion is transparent, that enables said aqueous solution to be viewed directly; wherein, said isotropic aqueous solution is a solution in which 100 parts by weight of a polysaccharide derivative, having a weight average molecular weight of roughly 10,000 to roughly 200,000, is dissolved in roughly 110 to roughly 2,000 parts by weight of a water-based medium composed of an amount of water that is roughly 25 to roughly 450 parts by weight with respect to 100 parts by weight of said polysaccharide derivative, and an amphipathic substance.

The laminated body of the present invention can be produced by sealing an isotropic aqueous solution of the above-mentioned constitution in a cell, of which at least one portion is transparent, that enables said aqueous solution to be viewed directly.

BEST MODE FOR CARRYING OUT THE INVENTION

Figure 1:
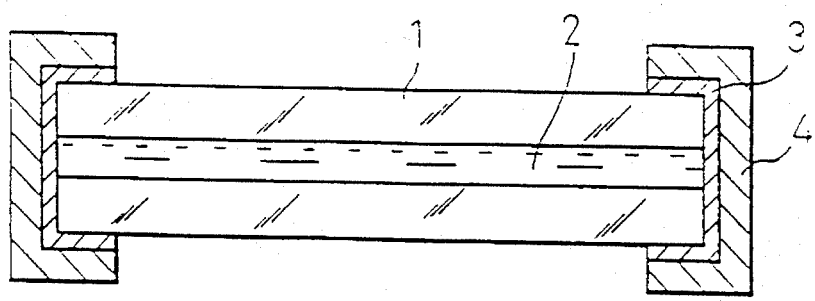
FIG. 1 is a cross-sectional view schematically illustrating one example of the self-responding laminated body as claimed in the present invention.

The aqueous solution used in the present invention is essentially composed of a water-based medium consisting of water and an amphipathic substance, and a polysaccharide derivative which dissolves in this water-based medium to form an isotropic solution in which said polysaccharide derivative dissolved in the medium aggregates resulting in the occurrence of cloudy scattering and a decrease in optical transmittance due to a rise in temperature. This aqueous solution is a self-responding-type isotropic solution which satisfies the conditions indicated below.
1. Phase changes between a transparent and opaque state must be reversible.
2. Reversible changes must be able to be repeated without phase separation.
3. The temperature at which phase transition begins must be low.
4. The material must be colorless or the color does not change.
5. The material must be durable.
6. The material must not be toxic or cause environmental pollution.

Thus, the present invention has made it possible for the first time for an isotropic aqueous solution of a polysaccharide derivative that exhibits a cloudy, opaque state to be stably and reversibly changed by a rise in temperature.

Those polysaccharide derivatives useful in the present invention are those that contain ion-ionic functional groups, uniformly dissolve to form aqueous solutions even at high concentrations of roughly 25% to roughly 50% by weight at room temperature, and change to a cloudy, opaque state as temperature rises. There are no particular limitations on the base polysaccharide, with examples of polysaccharides that can be widely used including cellulose, pluran and dextran. Specific examples of derivatives of those polysaccharides include hydroxypropylcellulose, hydroxypropylpluran and hydroxypropyldextran, all of which are obtained by addition of large amounts of propylene oxide. Cellulose derivatives are particularly important due to their high stability. Thus, although the following description will focus primarily on cellulose derivatives unless specified otherwise, the present invention is naturally not limited to these. In addition, if the average molecular weight of the polysaccharide derivative is too small, there is little aggregation and clouding is weak. In contrast, if it is too large, aggregation ends up being greater than polymer effects, thus resulting in increased susceptibility to phase separation. In either case, the results are inappropriate. Thus, the molecular weight of the polysaccharide derivative is within a range of roughly 10,000 to roughly 200,000, with a range of roughly 15,000 to roughly 100,000 being preferable. In addition, derivatives having two or more types of molecular weight distribution may be used as a mixture.

Cellulose is soluble in numerous solvents when functional groups are added. In order for an aqueous solution of such a cellulose derivative to aggregate and become cloudy by a rise in temperature, it is necessary for hydrophobic bonding strength to act on the functional groups (bonding strength resulting from an increase in affinity between hydrophobic groups caused by destruction of bonded water). In order to do this, since ionic functional groups are unsuitable for use in the present invention because of the action of ionic repulsion, functional groups should be non-ionic groups also having hydrophilic groups such as hydroxyl groups, ether bonded portions, ester bonded portions or amide bonded portions, and hydrophobic groups such as methyl and ethyl groups. For example, when a hydroxyethyl group and hydroxypropyl group are compared, although hydroxyethylcellulose has hydrophilic groups and is water-soluble, it is unable to aggregate and form a cloudy state because it does not have hydrophobic groups. In contrast, in addition to being water-soluble, hydroxypropylcellulose is able to aggregate and form a cloudy state. Thus, as is represented by hydroxypropyl groups, water-soluble polysaccharide derivatives to which functional groups are added that also have non-ionic hydrophilic and hydrophobic groups, and uniformly dissolve in water even at high concentrations of roughly 25 to roughly 50 parts by weight at room temperature, are useful in the present invention. Furthermore, one type or a plurality of types of functional groups may be added, and there are no particular limitations on that addition. For example, examples of derivatives include those in which an additional functional group is added to the hydroxyl group of an added hydroxylpropyl group, as well as those in which a hydroxypropyl group is added as an additional functional group (e.g., a derivative added to hydroxyethylcellulose), and said derivatives are not limited to derivatives to which a single type of functional group has been added. These functional groups and their addition methods are disclosed in detail in Vol. 19 of "Organic Chemistry" published by Asakura Shoten Publishing. By combining these methods with general addition reactions, the balance between hydrophilic and hydrophobic properties can be adjusted by adding hydroxyl, lower alkyl or halogen groups and so forth.

Amphipathic substances refer to compounds that have both hydrophilic and hydrophobic portions. These substances work to prevent the occurrence of phase separation when the above-mentioned isotropic aqueous solution of a polysaccharide derivative aggregates and becomes cloudy. The principle of the action of amphipathic substances is thought to involve water molecules being incorporated within aggregates together with the amphipathic substance at the level of molecules or micelles when the polysaccharide derivative becomes cloudy and aggregates, thus converting the water molecules into bonded water to not allow the occurrence of phase separation. However, even if an amphipathic substance is added, if the concentration of polysaccharide derivative with respect to water is less than roughly 18% by weight, and more reliably less than roughly 25% by weight, incorporation of water molecules becomes inadequate, thus resulting in an increase in the amount of free water which leads to separation of water and increased susceptibility to phase separation. In fact, aggregation is typically weakened by the addition of amphipathic substances, and the starting temperature of clouding and aggregation shifts several degrees higher. However, since the starting temperature of clouding and aggregation can be easily controlled by the composition of the water-based medium (mixing ratio of water and amphipathic molecules) and the concentration of the polysaccharide derivative-water-based medium, it can be lowered to the vicinity of room temperature, important from the viewpoint of practical use, and even down to actual room temperature. In addition, the starting temperature of clouding and aggregation can also be lowered by the addition of electrolytes such as sodium chloride, and the starting temperature can be lowered according to the amount added. This is the result of electrolytes working to promote hydrophobic bonding by destroying bonded water having an ice-like structure wherein ions are in close proximity to hydrophobic groups. Moreover, hydrophobic groups of the amphipathic substance form hydrophobic bonds with hydrophobic groups of the polysaccharide derivative at this time, while hydrophilic groups maintain incorporation of water molecules by hydration. Phase separation is thus thought to be prevented as a result of overall phase balance being maintained by the specific action of this amphipathic substance. In contrast, in the case of an amphipathic substance not being present, hydrophobic bonds form between polysaccharide derivative molecules, which together with resulting polymer effects, results in fine aggregation. This results in the occurrence of phase separation resulting in an irreversible change.

Accordingly, by sealing this isotropic aqueous solution in a cell, a self-responding laminated body can be obtained unlike that of the prior art which, in addition to having its starting point of clouding and aggregation at room temperature or in the vicinity of room temperature, is able to obtain a reversible change that is both stable and repeatable. Furthermore, although it is preferable that the hydrophilic portion of this amphipathic substance be neutral in order to stabilize the aqueous solution, it may also be ionic, as in the case of sodium sulfonate, or non-ionic, as in the case of a hydroxyl group.

The basic principle is that, if the polysaccharide derivative has a hydrophobic group that causes clouding and aggregation due to a rise in temperature of an aqueous solution due to the effects of hydrophobic bonding, it can be used widely without any particular limitations. The concentration at this time should be at least roughly 18% by weight, and preferably at least roughly 25% by weight, as the ratio of water to polysaccharide derivative resulting from phase separation of water. There is no particular need to increase the concentration, and conversely, this can weaken the effect of hydrophobic bonding, which although will not cause phase separation, will weaken clouding and blocking of light while also increasing viscosity, thus making uniform lamination free of air bubbles difficult. The maximum concentration should therefore be no more than roughly 50% by weight. Accordingly, although the concentration is not limited to that below roughly 50% by weight, in the case of that having a small amount of amphipathic substance added, and a liquid phase is adopted in the manner of hydroxypropylcellulose that exhibits interference colors, it will be difficult to obtain a colorless, transparent isotropic aqueous solution unless the concentration is less than roughly 50%. However, even in the case of, for example, a composition of 75% by weight of hydroxypropylcellulose (with the remaining 25% by weight consisting of a 5% by weight aqueous solution of sodium chloride), when the ratio of the hydroxypropylcellulose to total weight was made to be roughly 30% by weight by adding an amphipathic substance such as poloxypropylene-2-ethyl-2-hydroxymethyl-1,3-propanediol having a molecular weight of 400 as solvent, clouding changes appeared at roughly 67° C. By taking advantage of the solvent action of non-ionic amphipathic substances in this manner, the concentration (ratio of water to polysaccharide derivative) does not have to be limited to roughly 50% by weight or less. Furthermore, from the standpoint of practicality, lowering viscosity by lowering the total ratio of polysaccharide derivative makes production extremely easy. For example, an isotropic aqueous solution wherein the concentration of polysaccharide derivative that can be obtained by ordinary stirring is roughly 30% by weight can be debubbled relatively easily. For example, by placing this isotropic aqueous solution on a substrate, laminating, applying pressure, washing and then sealing the outer edges, a uniform laminated body can be obtained that is free of air bubbles. Thus, from the perspective of clouding change and reversing stability, the amount of water (which may contain electrolyte) should be roughly 25 to roughly 450 parts by weight, and preferably roughly 50 to roughly 300 parts by weight, with respect to 100 parts by weight of polysaccharide derivative.

Amphipathic substances refer to compounds that have both hydrophilic and hydrophobic groups, and either dissolve or uniformly disperse in water at room temperature. Examples of hydrophilic groups include non-ionic groups such as hydroxyl groups, ether bonded portions and ester bonded portions, and ionic groups such as sodium sulfonate. Examples of hydrophobic groups include lower alkyl groups such as methyl, ethyl, propyl and butyl groups as well as higher alkyl groups having 6–22 carbon atoms, and non-ionic groups such as straight chain alkyl groups, branched chain alkyl groups and aromatic alkyl groups. In the case of ionic groups, although it is possible to adjust the pH of the resulting solution with buffer, a neutral salt is preferable from the viewpoint of stability. If the molecular weight of amphipathic substance is excessively large, it becomes easier to demonstrate irreversible changes due to polymer effects. Better effects are not demonstrated just because the molecular weight is large, the viscosity of the isotropic aqueous solution increases, and workability is worsened. In addition, those compounds having halogen substitution groups such as chlorine (those in which molecular weight is simply made larger) also do not demonstrate better effects. Accordingly, the molecular weight of the amphipathic substance for the oligomer region should be roughly 3,000 or less, with that of roughly 1,000 or less being preferable since it makes the compound easier to use. On the other hand, if the molecular weight of the amphipathic substance is too low such as roughly 100 or less, it will be difficult for it to demonstrate the action of the amphipathic substance of the present invention. Thus, it is preferable that is molecular weight be at least roughly 140. Furthermore, since ionic groups are extremely hydrophilic, the hydrophobic groups should be alkyl groups having 6–22 carbon atoms in order to balance these ionic groups.

Thus, examples of non-ionic amphipathic substances include dipropylene glycol monomethyl ether, tripropylene glycol monomethyl ether, diethylene glycol monobutyl ether, polypropylene glycol having a molecular weight of 200 to 1,000, polyoxypropylene glycerine having a molecular weight of 400 to 1,000, polyoxypropylene-2-ethyl-2-hydroxymethyl-1,3-propanediol having a molecular weight of 300 to 800, a block oligomer of polyoxyethylene and polyoxyproylene having a molecular weight of 300 to 2,000 (weight ratio 50:50), poly(oxyethylene-oxypropylene)glycol monomethyl ether having a molecular weight of 250 to 3,000 and weight ratio of 50:50, polyoxypropylene sorbitol having a molecular weight of 700 to 3,000, and polyoxyethylene higher fatty acid monoethanol amide (e.g., Aizet 5C and 5L manufacturedby Kawaken Fine Chemical Co., Ltd.). Thus, compounds having both hydrophilic groups, such as a hydroxyl group or ether bonded portion, and hydrophobic groups, such as a lower alkyl group having 1–4 carbon atoms, can be widely used. The amount of this amphipathic substance added is roughly 0.5 to roughly 800 parts by weight, and preferably roughly 3 to roughly 600 parts by weight, with respect to 100 parts by weight of water present in the isotropic aqueous solution. In addition, two or more types of amphipathic substances may be mixed and used. Moreover, as was previously described, even if the amount of water with respect to 100 parts by weight of polysaccharide derivative is 100 parts by weight or less, if the amount of non-ionic amphipathic substance added is increased, a colorless, transparent isotropic aqueous solution is obtained. This is thought to be the result of the amphipathic substance demonstrating the action of a solvent. In addition, since cohesive force weakens if the amount of water is relatively small, a higher temperature is required in order to obtain stronger clouding and light blocking effects. Thus, if 100 parts by weight of polysaccharide derivative is taken to be the standard, the amount of water-based medium consisting of water (which may contain electrolyte and lower alcohol) and amphipathic substance should be roughly 100 to roughly 2,000 parts by weight, and preferably roughly 150 to roughly 1,800 parts by weight. In addition, as is indicated in the examples, by adjusting the composition of the isotropic aqueous solution, the rate at which clouding changes and the clouding starting temperature can be designed as desired, and the clouding starting temperature can easily be lowered by roughly 5° C. This is useful in indoor and outdoor windows required to have a semi-transparent state at room temperature, electronic curtains such as indoor partitions that are temperature-controlled with a heating element, and special industrial applications (e.g., temperature sensors and so forth).

Examples of ionic amphipathic substances include sodium laurylsulfonate, sodium dodecylbenzenesulfonate, sodium polyoxyethylene higher fatty acid monoethanolamide sulfonate (e.g., Amizet S3L manufactured by Kawaken Fine Chemical Co., Ltd.), and amphoteric amidopropylbetaine laurate. Thus, compounds that have both ionic hydrophilic groups, which become neutral following disassociation, and hydrophobic groups, such as alkyl groups having 6–22 carbon atoms, can be widely used. These can be used in amounts similar to that previously described with respect to non-ionic amphipathic substances.

In order to shift the temperature of phase transition to a cloudy state to a lower temperature, inorganic electrolyte should be added as a temperature shifting agent. This is preferably a neutral salt, examples of which include sodium chloride, potassium chloride, lithium chloride, sodium nitrate and sodium sulfate. The amount added may be 0.1 to 10 parts by weight with respect to 100 parts by weight of water, with an amount of 1 to 8 parts by weight normally being preferable for use in windows and so forth. Moreover, lower alcohols, which in addition to acting as a temperature shifting agent, also have solvent action, can also be used, examples of which include ethyl alcohol, sec-butyl alcohol and propylene glycol. Ethyl alcohol and propylene glycol contribute to raising temperature, while sec-butyl alcohol contributes to lowering temperature. The amounts in which these are added may be 0.5 to 500 parts by weight with respect to 100 parts by weight of water, with an amount of 3 to 300 parts by weight normally being preferable for use in windows and so forth.

In addition, coloring agents for arbitrarily coloring the isotropic aqueous solution or ultraviolet absorbers for improving light resistance may also be added. In addition, near infrared absorber may also be added for absorbing heat. Coloring agents should be dissolved in water, examples of which include C.I. Direct Blue 86, C.I. Acid Red 8 and C.I. Acid Yellow 11. The amount of coloring agent added should be 0.01 to 2 parts by weight per 100 parts by weight of isotropic aqueous solution. Ultraviolet absorber is required to be water-soluble, examples of which include Sumisorb 110S manufactured by Sumitomo Chemical Co., Ltd. The amount of ultraviolet absorber added should be 0.01 to 2 parts by weight per 100 parts by weight of isotropic aqueous solution. In addition, if air dissolved in the isotropic aqueous solution is replaced with an inert gas (e.g., nitrogen or helium) for improved stability, antioxidative effects are also obtained, thus making this particularly preferable in the case of prolonged use as a window and so forth.

The water may be ordinary pure water. Furthermore, the water-based medium referred to in the present invention is a low viscosity liquid composed of water and an amphipathic substance. Moreover, it may also contain the above-mentioned electrolytes, lower alcohols or other additives.

Figure 8:
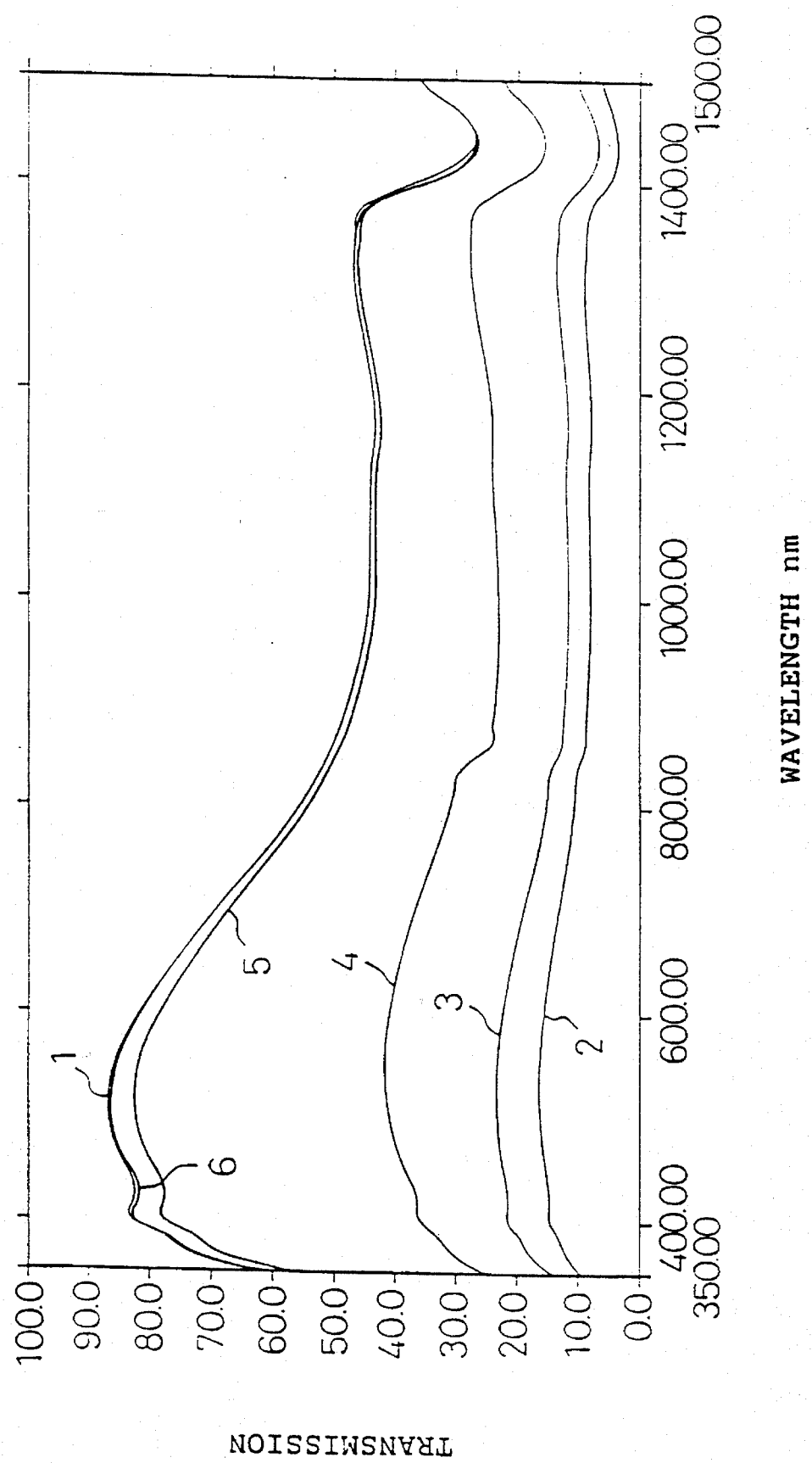
FIGS. 8 and 9 are graphs indicating the relationship between temperature and spectral changes in one example of the self-responding laminated body as claimed in the present invention.

The temperature dependency of the self-responding laminated body of the present invention is dependent on the isotropic aqueous solution used. For example, an isotropic aqueous solution that is colorless and transparent at 20° C. was prepared by using a non-ionic amphipathic substance and was composed of 100 parts by weight of hydroxypropylcellulose (hydroxypropyl groups: 62.4%, viscosity of 2% aqueous solution: 8.5 cps, average molecular weight: roughly 60,000), 10 parts by weight of polyoxypropylene-2-ethyl-2-hydroxymethyl-1,3-propanediol having an average molecular weight of 400, 6 parts by weight of sodium chloride and 200 parts by weight of pure water. This isotropic aqueous solution was provided at a thickness of 0.2 mm between 10 cm squares of float soda glass having a thickness of 6 mm manufactured by Asahi Glass Co., Ltd. to form a laminated body. The reversing stability at room temperature and 60° C. as well as the stability after 10 ng-term standing at 60° C. of this laminated body were favorable and did not result in phase separation. In addition, the rate of change was extremely rapid. Clouding began at roughly 34° C. and reached a state of complete blockage that prevented the passage of light due to strong clouding at roughly 40° C. The results of measuring the optical transmission spectra of the laminated body in the ultraviolet region from 350 nm to 1500 nm, in the visible light region and in the near infrared region by bringing the central portion of the laminated body in close proximity (roughly 1 mm) to the window of an integrating sphere while using the Model U-4000 Spectrophotometer manufactured by Hitachi, Ltd., which is suited to measurement of large samples demonstrating light scattering, are shown in FIG. 8. No. 1 indicates the initial spectrum at room temperature (roughly 20° C., No. 2 indicates the spectrum at roughly 45° C., while Nos. 3, 4, 5 and 6 indicate the spectra measured during cooling from this temperature. Surprisingly, it was found that the measured spectra completely returned to the initial spectrum while uniformly maintaining light blocking properties for all wavelength regions. Similar results were obtained over a wide wavelength region from 250 nm to 2500 nm. This trend was observed in the case of using a non-ionic amphipathic substance. When this laminated body was faced directly towards the sun and observed while allowing sunlight to pass through it, the light blocking property of spectrum 2 was only in a uniform clouded state, and even the contour of the sun was completely invisible. In addition, when the laminated body was selectively irradiated with direct sunlight at an angle of 45 degrees in Tokyo during February in an atmosphere of 28° C. in consideration of summer use, the irradiated portion formed a shadow as a result of clouding and blocking out the light, and it was not possible to see through it. There was no change whatsoever in the non-radiated portion, and it remained colorless and transparent. The clouded surface that blocked light moved together with movement of this irradiated portion.

Figure 9:
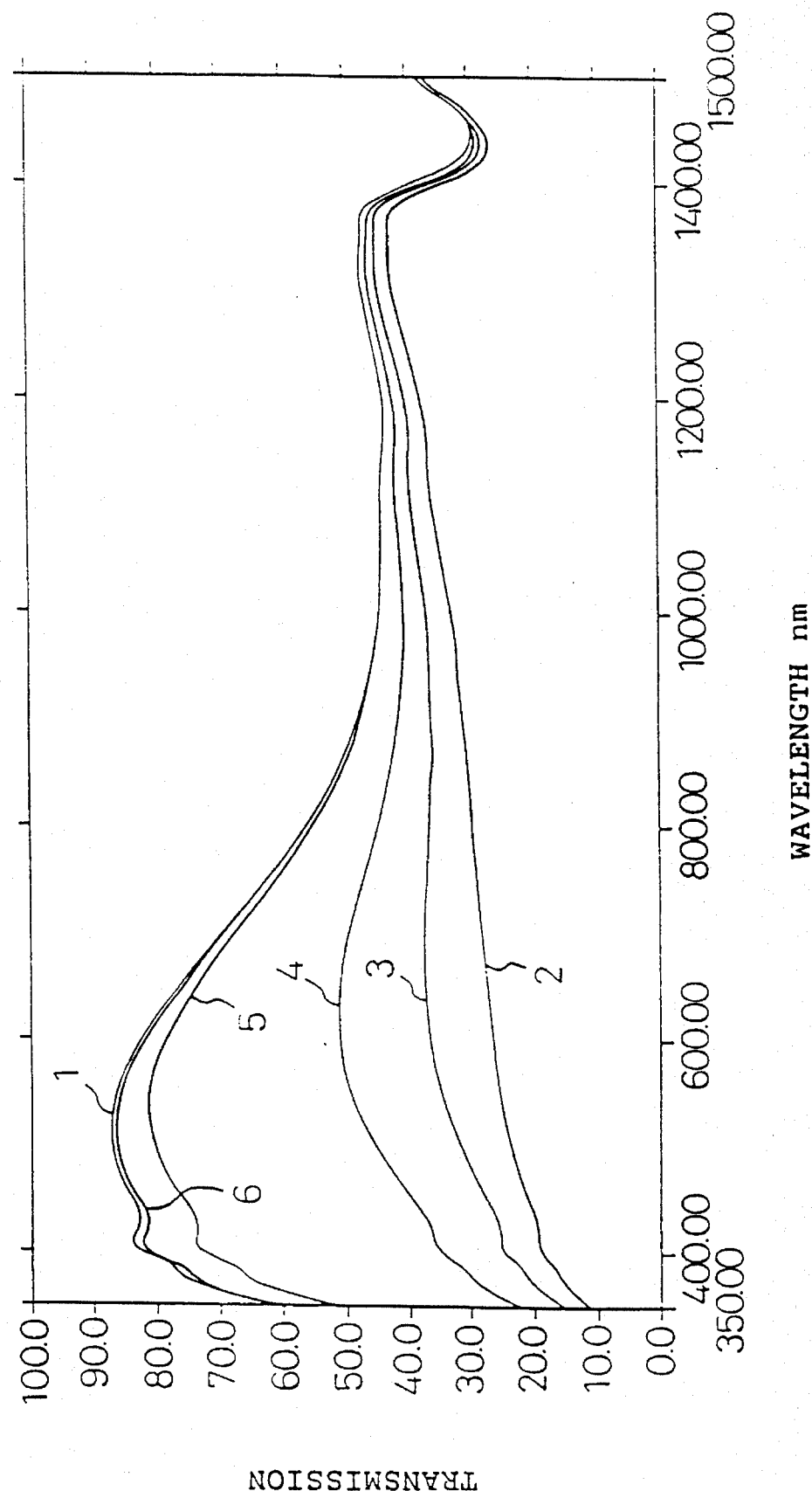

Next, for example, an isotropic aqueous solution that is colorless and transparent at 20° C. was prepared by using an ionic amphipathic substance and was composed of 100 parts by weight of hydroxypropylcellulose (hydroxypropyl groups: 62.4%, viscosity of 2% aqueous solution: 8.5 cps, average molecular weight: roughly 60,000), 10 parts by weight of sodium laurylsulfate, 6 parts by weight of sodium chloride and 200 parts by weight of pure water. A laminated body was then fabricated having a thickness of 0.2 mm in the same manner as described above. The reversing stability at room temperature and 60° C. as well as the stability after long-term standing at 60° C. of this laminated body were favorable and did not result in phase separation. The results of measuring the optical transmission spectra of this laminated body using the same method as described above are shown in FIG. 9. No. 1 indicates the initial spectrum at room temperature (roughly 20° C., No. 2 indicates the spectrum at roughly 45° C., while Nos. 3, 4, 5 and 6 indicate the spectra measured during cooling from this temperature. It was found that this laminated body completely returned to the initial spectrum while maintaining the property of selectively blocking out both visible and ultraviolet light. This trend was observed in the case of using an ionic amphipathic substance. Although obvious, both an ionic amphipathic substance and a non-ionic amphipathic substance may be added as a mixture.

Figure 2:
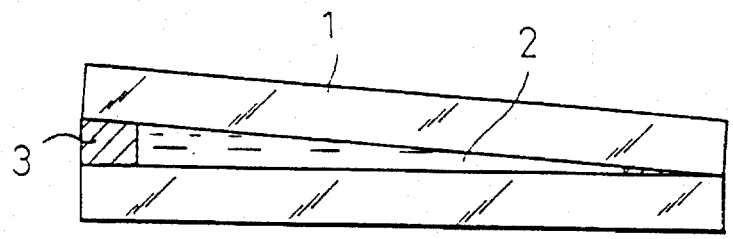
FIGS. 2, 3, 4, 5, 6 and 7 are cross-sectional views schematically illustrating other examples of the self-responding laminated body as claimed in the present invention.
Figure 3:
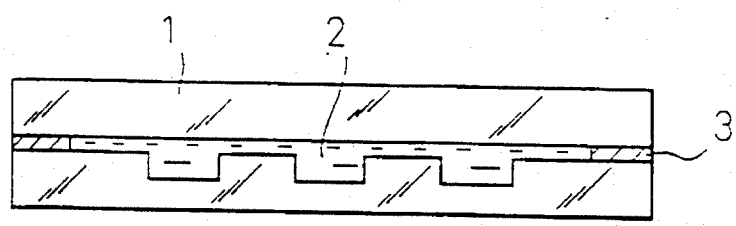

Next, the following provides a description of the structure of the laminated body as claimed in the present invention and a window in which it is used. FIGS. 1, 2 and 3 are schematic cross-sectional views of one example of the laminated body of the present invention. Reference numeral 1 indicates the substrate plates, 2 the isotropic aqueous solution, 3 the sealants, and 4 the frames.

The laminated body of FIG. 1 has the basic form of the laminated body as claimed in the present invention. At least one portion is transparent, and isotropic aqueous solution 2 is laminated between substrate plates 1 that enable isotropic aqueous solution 2 to be viewed directly. Although there is no particular limitation on the layer thickness of isotropic aqueous solution 2, it should be roughly 0.01 to 2 mm, and light can be adequately blocked out at a thickness of roughly 0.2 mm. Sealants 3 are for preventing evaporation of water. They may be arranged between the substrate plates or arranged to their outside around the periphery. In addition, anchoring frames 4 may be provided by means of sealants 3 (e.g, in the form of a U-shaped member, L-shaped member, metal tape and so forth). These frames 4 are particularly effective in the case of a production process in which the isotropic aqueous solution is sealed after lamination. In addition, in order to achieve stronger sealing and greater ease of production, after, for example, temporarily sealing the periphery with adhesive metal tape, adhesive rubber or rapid-cured plastic, the isotropic aqueous solution adhered to the periphery is removed by washing, after which multi-stage sealing may be performed by a process in which the frames are locked by means of sealants 3. Moreover, corner caps may be used on the edges as auxiliary frames. In addition, in the case of a laminated body in which an external terminal is provided for supplying with electrical power, it goes without saying that the terminal should be mounted while paying attention to shorting by the frames. Examples of sealants 3 that can be used include epoxy resin (e.g., Flep manufactured by Toray-Thiocoll), acrylic resin (e.g., Photobond, a photosensitive resin manufactured by Sunrise Meisei), polysulfide sealant, isobutylene sealant or moisture-resistant acrylic adhesives. An inorganic sealant that adheres to the glass may also be used as necessary (e.g., Celasolza manufactured by Asahi Glass).

Figure 10:
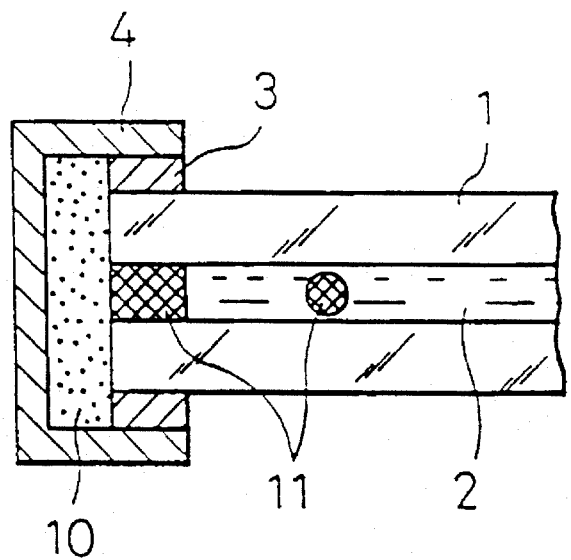
FIGS. 10 and 11 are cross-sectional views schematically illustrating other examples of the self-responding laminated body as claimed in the present invent ion.
Figure 11:
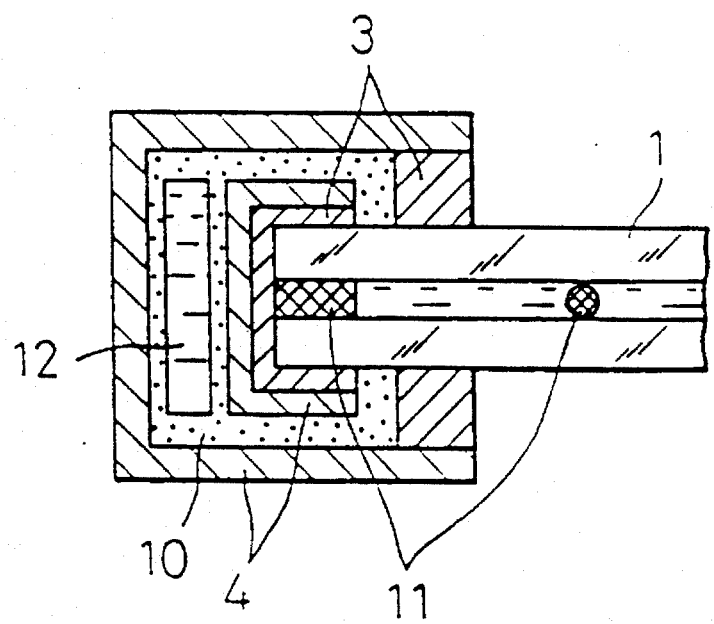

Moreover, the inventors of the present invention conducted studies on a process by which an organic sealant could reliably eliminate the evaporation of water for a long time. The inventors of the present invention noticed that the phenomenon of water evaporating due to passage through a film prevents the gas-liquid equilibrium from existing. They then used this to solve the problem by sealing in two stages. Namely, a second sealing portion was provided on the outside of a first sealing portion, and a region consisting of a saturated water vapor and/or water environment was created between these sealing portions. This region was then sealed between laminated substrate plates to prevent evaporation of water by maintaining a gas-liquid equilibrium with the isotropic aqueous solution at all times. FIGS. 10 and 11 are schematic cross-sectional views of one example of the present invention having this type of constitution. Reference numeral 1 indicates the substrate plates, 2 the isotropic aqueous solution, 3 the sealants, 4 the frames, 10 the saturated water vapor and/or water, and 12 a tube. Thus, by forming a region of a saturated water vapor environment in the first sealing portion, a gas-liquid equilibrium is obtained, thus being able to prevent evaporation of water from the isotropic aqueous solution. The amount of water placed between the first sealing portion and second sealing portion should be determined in consideration of the amount of water that evaporates from the second sealing portion, and can be calculated easily. The region of the saturated water vapor environment can be maintained over a prolonged period of 10 years or more with only a small amount of water. For example, the moisture permeation properties of widely used glass sealants under conditions of a temperature of 20° C., thickness of 4 mm and relative humidity of 85% are roughly 0.05 g/square meter-day for polyisobutylene sealants, and roughly 1 g/square meter-day for polysulfide sealants. In addition, the saturated water vapor referred to here is not meant to be in the strict sense, but rather that which is essentially saturated, and is used in that sense. Naturally, as liquid water is present, the saturated state is maintained regardless of temperature.

In other words, if the environment between the first and second sealing portions is in the state of saturated water vapor, evaporation of water from the isotropic aqueous solution can be prevented. In order to accomplish this, water should be continuously maintained between the first and second sealing portions. There are no particular limitations on the method for maintaining this water, and it can be widely used. Examples of such include a method wherein water is injected between the first and second sealing portions through injection holes in the laminated body extending to the second sealing portion, a method wherein a water retaining material, such as a highly absorbent polymer, glass fiber, microcapsules, flocculent fiber and sponge, is arranged while containing water, a method wherein a tube having a film that allows passage of water is arranged by placing in water, and a method wherein a water reservoir is provided in the frame bottom of the laminated body.

In order to reliably control and maintain thickness, spacers 11, in the form of glass beads or plastic beads, should be used within the layer of isotropic aqueous solution, which is transparent and can be viewed directly, as shown in FIGS. 10 and 11. In this case, the use of a substance having a refractive index close to that of isotropic aqueous solution 2 (roughly 1.4) is preferable since it makes the substance difficult to recognize.

The substrate plates should have at least one portion that is transparent and allow isotropic aqueous solution 2 to be viewed directly. Various materials can be used, examples of which include glass, plastic, ceramics and metal. Single materials, compound materials and materials with treated surfaces can be used provided they are in the shape of plates. These may also be used in combination. For example, the combination of glass and blackened aluminum plates is effective for self-response since the aluminum plate is an efficient light absorber. In addition, examples of glass plates used as window materials include simple pane glass, reinforced glass, wired glass plate, heat absorbing glass, heat reflecting glass, heat absorbing and reflecting glass, laminated glass, ultraviolet absorbing glass, transparent conductive glass, double layer glass, transparent pane glass and polycarbonate compound glass. A pair of substrates can be used according to the purpose by suitably combining different types, thicknesses and so forth. The shape of the cross-sectional surface can be selected as desired, and is usually either a right angle, roughly 45 degree angle or partial bevel cut. This can be used for the sealing structure, production and so forth. In addition, although not specifically shown in the drawings, substrate plates may be selected so as to provide sealant bank such as different sizes of substrate plate lamination or shifted substrate plate lamination. In addition, protecting the surface in contact with the isotropic aqueous solution of soda lime glass and a transparent conductive film is preferable in terms of durability.

Here, heat absorbing glass refers to heat absorbing glass, heat reflecting glass (which both strongly reflects and absorbs heat), heat absorbing and reflecting glass, and glass coated with a near infrared absorber, that is designed to absorb solar energy. Green heat absorbing glass, designed to strongly absorb ultraviolet and near infrared rays due to addition of cerium and titanium or increased amounts of iron, colorless, transparent heat reflecting glass referred to as Low-E glass, and blue heat reflecting glass are particularly preferable. For example, a window using a compound multi-layer laminated body wherein a gas layer is created in a laminated body containing isotropic aqueous solution 2 between ultraviolet absorbing glass and simple pane glass, followed by the addition of multiple layers of Low-E glass (e.g., K glass manufactured by the Pilkinton Corporation), demonstrates effective self-response with respect to selective blocking of light while still retaining the advantages of colorless transparency, energy conservation and weather resistance, thus enabling the providing of a window unlike anything in the prior art. In addition, since a pair of ordinary simple glass panes are also heated as a result of absorbing solar energy, it goes without saying that they too can be used in the present invention.

Moreover, in order to obtain weather resistance for a longer period of time, the ultraviolet rays contained in sunlight should be cut out. In order to do this, it is advantageous to use ultraviolet absorbing glass. Ultraviolet absorbing glass specifically refers to glass that is able to specifically cut out ultraviolet rays at a wavelength of 330 nm or less, and preferably 350 nm or less. In the case of typical soda lime glass, since the transmission rate of ultraviolet light at a wavelength of 330 mm or less decreases rapidly if it has a thickness of roughly at least 5 mm, it is preferable in terms of weather resistance. For example, the transmission rate of ultraviolet light at a wavelength of 330 mm is roughly 16% for a thickness of 6 mm, and roughly 39% for a thickness of 3 mm. In addition, since absorption of heat naturally also increases with thickness, thicker glass is also advantageous in terms of selective blocking of light. An example of soda lime glass that is able to more effectively cut out ultraviolet rays is the above-mentioned green heat absorbing glass (e.g., Greenral SP manufactured by Central Glass Co., Ltd. demonstrating a transmission rate of roughly 0% for ultraviolet light having a wavelength of 330 nm at a thickness of 6 mm). In addition, borosilicate glass, which cuts out ultraviolet rays by dispersion of fine particles of halogenated copper (e.g., ITY manufactured by Gorei Seiko Glass Co., Ltd.), is able to cut out ultraviolet rays over the entire ultraviolet region under 400 nm with high selectivity due to sharp absorption properties resulting from bulking as indicated in Japanese Unexamined Patent Publication No. 4-18501 and Japanese Unexamined Patent Publication No. 5-229848. Moreover, if an ultraviolet absorbing layer in the form of a liquid film layer is formed by laminating a liquid ultraviolet absorber (e.g., Tinuvin 109, 171 or 384 manufactured by Chiba-Geigy Co., Ltd.), a stable filter is obtained that is able to reliably absorb ultraviolet rays in a plane in the manner of absorption of glass bulk. For example, the inventors of the present invention measured the transmission spectrum of the ultraviolet region after laminating Tinuvin 171 and Tinuvin 109 at a thickness of 0.1 mm between soda lime glass substrate plates having a thickness of 3 mm. Transmission began to rise at 392 nm in the case of the former, and at 412 mm in the case of the latter. Even if the thickness of the former was changed to 0.025 mm, the wavelength at which transmission started was only shifted to 406 nm, thus indicating that ultraviolet rays were able to be reliably absorbed. In addition, laminated glass is also available that is laminated with butyral film that absorbs ultraviolet rays at a wavelength of 380 nm or less. Incidentally, the transmission rate of soda lime glass for ultraviolet rays at a wavelength of 390 nm at a thickness of 6 mm is roughly 85%. Next, a laminated body, wherein the laminated body of Example 1 and the substrate plate on one side were replaced with ultraviolet absorbing glass, was irradiated for 500 hours under conditions of ultraviolet light intensity of 100 mW, black panel temperature of 63° C. and irradiation distance of 235 mm using the Model SUV-F2 exposure device manufactured by Iwasaki Electric Co., Ltd., having a level of luminous ultraviolet energy roughly 10 times higher than a sunshine carbon arc weather meter. In the laminated body of Example 1 (using soda lime glass having a thickness of 3 mm), considerable unevenness occurred in clouding accompanying the formation of air bubbles. In the case of the laminated body using ITY-420 substrate plates at a thickness of 1.5 mm, there were no changes observed in clouding properties. Even in a laminated body composed of 3 mm thick soda lime glass, 0.375 mm thick butyral film and 3 mm thick soda lime glass, there were still no changes observed in clouding properties. In addition, in the case of a laminated body using Greenral SP substrate plates having a thickness of 6 mm, there were no changes observed in clouding properties. In the case of a laminated body using 6 mm thick soda lime glass substrate plates, although unevenness was observed in clouding properties, there was no formation of air bubbles and changes occurred reversibly, thus adequately enabling this laminated body to continue to be used.

Moreover, in the laminated body of FIG. 2, the degree of the cloudy opaque state was continuously changed by continuously changing the layer thickness of isotropic aqueous solution 2. This is effective for using daylight regulation in the vicinity of windows. In the laminated body shown in FIG. 3, certain portions of aqueous solution 2 are made thinner or eliminated, resulting in a laminated body that can be seen through (e.g., rear windows of automobiles) or that enables the display of image information in the form of figures, characters or abstract patterns (e.g., advertising devices).

Figure 4:
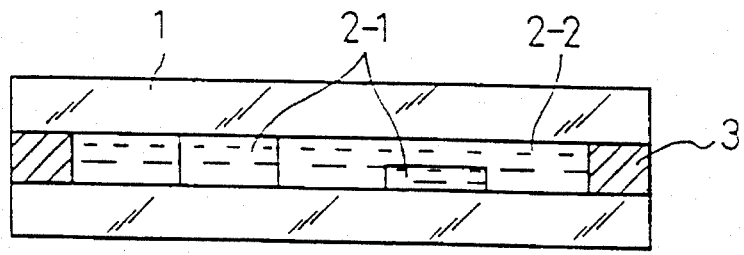

FIG. 4 is a schematic cross-sectional view of another example of the present invention. This laminated body is provided with two isotropic aqueous solutions 2-1 and 2-2 having different compositions, and is able to display image information due to differences in the degree of clouding. The arrangement of aqueous solutions 2-1 and 2-2 may be in parallel or in series. In addition, this laminated body may also be in the form of a laminated body that is able to display image information according to the presence or absence of clouding by using an ordinary polymer solution able to dissolve in water and having nearly the same concentration (e.g., aqueous solution of polyvinyl alcohol polymer) for aqueous solution 2-2. There are no particular limitations on the image information that can be used, examples of which include figures, characters and abstract patterns. Furthermore, in the case of a series arrangement, the two aqueous solutions may be separated with thin plate glass or transparent film.

Figure 5:
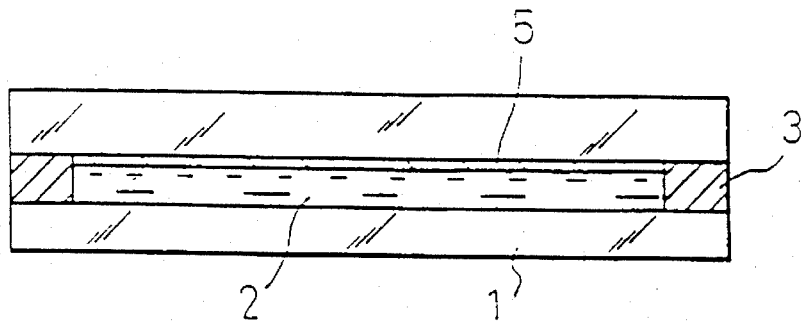

FIG. 5 is a schematic cross-sectional view of yet another example of the present invention. In this example, ultraviolet absorbing layer 5 is provided on the substrate plate on at least one side (and this substrate plate is placed on the outside of the window). Ultraviolet absorbing layer 5 may be on the surface of the substrate plate (e.g., Atom Varian UV manufactured by Atom Chemical and Paint Co., Ltd.) or on the inside of the substrate plate (e.g., laminated glass having a butyral film that absorbs ultraviolet rays or laminated glass having a liquid ultraviolet absorber). Alternatively, ultraviolet absorbing layer 5 may also be the substrate plate itself (e.g., Greenral SP manufactured by Central Glass Co., Ltd. or ITY manufactured by Gorei Seiko Glass Co., Ltd.). Although ordinary soda lime glass absorbs ultraviolet rays, since ultraviolet rays tend to penetrate easily when thickness is reduced, it is particularly preferable to provide ultraviolet absorbing layer 5 in cases of using thin plates having a thickness of roughly 4 mm or less.

Figure 6:
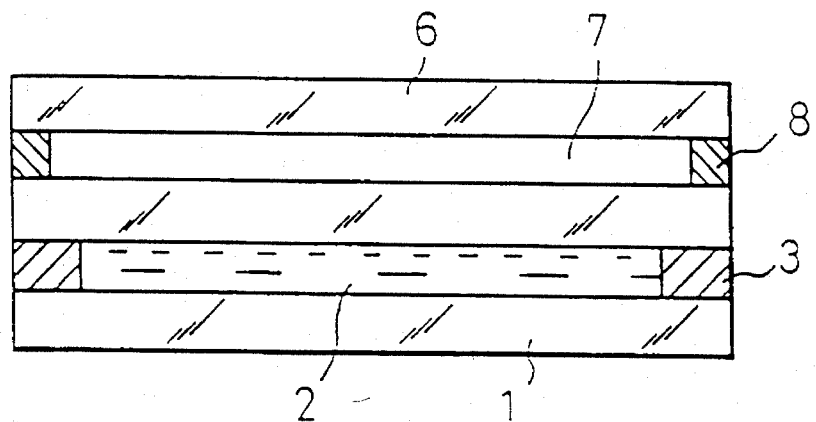

FIG. 6 is a cross-sectional view of yet another example of the present invention. This is a compound, multi-layer laminated body that uses the principle of a hot box to trap solar heat in a gas layer to provide heating effects while simultaneously providing heat insulating effects of conventional multi-layer glass. In addition to the laminated body, reference numeral 6 indicates an additional substrate plate, 7 the gas layer, and 8 the sealant of the gas layer. This structure is equivalent to changing the substrate plate of one side of conventional multi-layer glass into the laminated body of the present invention. Furthermore, the use of a wired glass plate for additional substrate plate 6, and using this glass surface on the inside is preferable in terms of energy conservation and safety in the case of breakage and so forth. This is because there is the risk of the glass breaking if the temperature rises excessively. This laminated body is extremely effective in ceiling windows and atrium windows particularly when combined with the ultraviolet absorbing layer of FIG. 5. In addition, by making contrivances in the shape of the frame and in mounting to form a mask or dissipate heat, the temperature rise of the sealing portions can be minimized, which is preferable for preventing evaporation of water.

Figure 7:
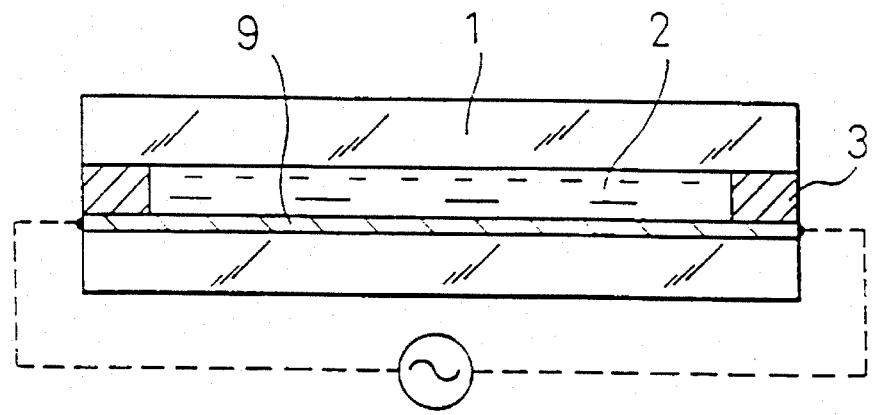

FIG. 7 is a schematic cross-sectional view of yet another example of the present invention. This laminated body is provided with a heating element to further expand the range of utilization of the laminated body of the present invention. This is provided to block the line of sight by artificially controlling the heat as an electronic curtain. As such, heating element layer 9 is provided in this laminated body. Heating element layer 9 may be provided outside the laminated body, or sandwiched within the laminated body. Examples of heating elements include transparent conductive films, carbon paste, metal paste, metal wire and barium titanate ceramics. Moreover, heating elements that can be both heated and cooled (e.g., Thermopanel manufactured by Komatsu Electronics Co., Ltd.) can also be used. The heating device can be placed over the entire surface of the substrate plate or only over a portion. In addition, it may also be divided into a striped pattern to enable uniform heating. Moreover, image information may also be displayed by using a heating element formed into an image or by selectively irradiating the substrate plate with infrared rays (e.g., a laser). Although not specifically shown in the drawings, it is preferable to prevent the sealing portions from being heated by either not providing the heating element at these portions, or giving these portions low resistance by using a metal conductor. In addition, the inner periphery of these sealing portions may be masked to block light from the transparent portion that tends to form easily on the outer periphery of the laminated body. These can naturally be automatically controlled by combining sensors and a control circuit. In addition, the temperature of the laminated body may also be controlled by circulating a cooling/heating medium (e.g., dry air or anti-freeze) in the gas layer of the compound, multi-layer laminated body of FIG. 6. This is particularly effective not only only in terms of comfort, but also from the aspect of energy conservation during air-conditioning in summer, by blocking out light while using automobile waste heat. If this is then changed into a gas layer in winter, it becomes equivalent to multi-layer glass, thereby being able to prevent cold from entering through the window. In addition, by using the laminated body of the present invention as window glass covering the entire roof of an automobile, a new concept in automobiles will be able to realized that provides both a sense of openness and comfort at the same time.

Examples of the window as claimed in the present invention include ordinary building windows, windows of vehicles such as automobiles and railroad cars, and windows of transportation machinery such as ships, airplanes and elevators. This window is referred to in the broad sense, and includes the glass ceilings of shopping arcades and atriums, door windows and partitions, as well as completely transparent glass doors, columns and walls. As examples of broader applications, the self-responding laminated body can be combined with construction material sashes or automobile frames to form a self-responding laminated body equipped with its own frame for each application in buildings, vehicles and so forth. Window units, which are installed in the same manner as in the past at the construction site, are also included in the present invention. The use of this unit structure is effective in being able to make the sealing of the self-responding laminated body more reliable, preventing evaporation of water due to penetration, and preventing sealing deterioration by light. This is particularly effective for semi-permanent use or use under harsh conditions as is the case with windows of ordinary buildings and vehicle windows.

Moreover, a method of use wherein the isotropic aqueous solution is contained in a hollow body, sphere, microcapsules or plastic sheet and formed into the shape of a plate by lamination and so forth is also include in the laminated body of the present invention provided that a portion is transparent and the aqueous solution can be viewed directly. In the case of hollow rods in particular, as long as the isotropic aqueous solution is able to be retained in the hollow portion, there are no particular limitations on material (e.g., glass or plastic), cross-sectional shape (e.g., circle, oval, rectangle or divided), size or the use of spacers. Moreover, if a gas layer tube is arranged within the hollow body, the reduced weight, heat insulating effects and hot box effects are obtained, thereby making the laminated body more functional. In addition, since the sealing portions are only on both ends, sealing can be performed both easily and reliably. This sealing should be performed by glass melting in particular. In addition, arranging a large number of these hollow bodies in a plane, they can be used in methods similar to curtains and blinds. Namely, when this collective hollow body is closed in the manner of a curtain, it is able to selectively become cloudy and block out light. Moreover, since it can be easily replaced, it could also be called a novel functional curtain. In addition, when this hollow body is arranged in a row within multi-layer glass, energy-saving multi-layer glass unlike that in the prior art can be obtained that is also able to control direct sunlight. Furthermore, in said laminated body, sealing and cutting out of ultraviolet rays can be performed in the same manner as previously described, and be manufactured by similar methods.

The laminated body as claimed in the present invention can be produced by a solution process, wherein the isotropic aqueous solution of the composition described above is laminated between glass substrates, and a solid process, wherein after providing a coated film, simple film, thin rods or small spheres of a solid composed of a polysaccharide derivative on the substrate plates, it is brought in contact with a water-based medium between the substrate plates and dissolved to form the isotropic aqueous solution having the composition described above. Even if flow unevenness occurs during pressurized lamination at that time, this does not result in any particular problem since it will become uniform as a result of self-diffusion if allowed to stand for several days.

In the solution process, since the isotropic aqueous solution has a relatively high viscosity, actions should be taken to prevent entrance of air bubbles. Air bubbles that have entered as a result of dissolving by normal stirring may be removed by pouring over an inclined surface under reduced pressure. Moreover, a particularly effective method consists of raising the temperature to rapidly aggregate and precipitate a low concentration aqueous solution of polysaccharide derivative, and removing the high-concentration aggregates that have precipitated on the bottom of the container with a snake pump and so forth to quantitatively and continuously obtain a high-concentration aqueous solution that is free of air bubbles. In order to obtain said aqueous solution more reliably, an aqueous solution of polysaccharide derivative, uniformly dissolved using water containing 0.1 to 5% by weight of electrolyte is used instead of pure water, is heated to aggregate and become cloudy, performing degassing or debubbling by stirring together with reducing pressure at the point the viscosity decreases rapidly, followed by allowing to stand undisturbed resulting in aggregation and precipitation. By uniformly mixing this high-concentration aqueous solution of polysaccharide derivative, amphipathic substance and low viscosity medium such as a water-based medium containing electrolyte and so forth, with a static mixer until the target composition is obtained, an isotropic aqueous solution free of air bubbles is obtained. According to this process, the isotropic aqueous solution of a polysaccharide derivative can be easily obtained by changing the composition of the low viscosity medium, making this extremely convenient. After placing this isotropic aqueous solution on a substrate plate and performing pressurized lamination, the outer edges should be sealed. This solution process is applicable to not only production of the laminated body of FIG. 1, but also to production of the laminated bodies of FIGS. 2 and 3 as well as a laminated body of curved glass and so forth. In addition, after thinly applying an isotropic aqueous solution of the desired composition to the entire surface of the substrate plate with a coater such as an applicator, and debubbling by allowing to stand, the opposing substrate plate may then be laminated. This debubbling by allowing to stand can be performed in a short time since the isotropic aqueous solution is in the form of a thin film. In addition, it is also favorable to allow the coated substrate plate to stand in saturated water vapor as necessary. Lamination should be performed by bringing the substrate plates into contact starting from the edges and then aligning the surfaces while being careful to prevent entry of air bubbles. High pressure is not particularly required. Moreover, lamination may also be performed under reduced pressure to prevent entry of air bubbles.

The solid process involves dispersing a water-based medium in a polysaccharide derivative between substrate plates to form a uniform isotropic aqueous solution of a desired composition. Various forms of solids can be used as was previously described. Although the form of the solid is not particularly limited, a simple coated film process is extremely effective. In this coated film process, the polysaccharide derivative is applied to a substrate plate using a normal method. After drying, the opposing substrate plate is laminated while providing a fixed interval between the plates. In this case, one process for doing this is a simultaneous lamination process in which these opposing substrate plates are laminated around a water-based medium followed by sealing, while another process is an injection lamination process wherein, after sealing the edges of the substrate plates, water-based medium is injected through injection holes in those gaps followed by sealing the holes. In the latter process, since the temperature of seal forming can be raised to 100° C. or higher, a wide range of sealants can be selected, thus resulting in easy and favorable sealing. This is particularly suitable for the use of solder that also adheres to the glass (e.g., Celasolza manufactured by Asahi Glass). In addition, an important factor that applies to all types of solid processes in general is that, in the case of not using a water-based medium on which degassing treatment has been performed, an infinite number of tiny air bubbles form over the entire surface together with dispersion and dissolution of water. As a result of examining the cause of this problem, it was found to be due to the liberation of air dissolved in the water-based medium resulting from dissolution of the polysaccharide derivative. However, it was found that this problem could be solved by using a water-based solvent from which dissolved air had been removed by heating to at least 60° C., and preferably to at least 70° C., or by using a water-based solvent that had been degassed under reduced pressure. Furthermore, in the case the amphipathic substance in the water-based medium separates due to degassing by heating, the amphipathic substance should be incorporated in the solid coated film or film and so forth. This process may also be applied to other additives, and the dispersion of only water or water containing electrolyte is preferable with respect to making additives uniform.. In addition, according to this solid process, by periodically providing or removing the coated film of polysaccharide derivative in the form of a striped pattern and so forth, laminating after filling the recesses with degassed water-based medium (e.g., pure water at 80° C.), and dispersing and dissolving after expelling excess water-based medium from the stripe grooves, an aqueous solution of desired composition can be laminated without using spacers. Similarly, a film may be used after it has been processed with stripe grooves, ripples, punched holes and so forth. Furthermore, not only does the heated water-based medium have the advantage of having been degassed, since it also offers the advantage of enabling excess water-based medium to be reliably expelled during lamination due to the difficulty of dispersion and dissolution at high temperatures, it is useful in producing an isotropic aqueous solution of a desired concentration.

The following provides a more detailed explanation of the present invention by indicating examples. Furthermore, although hydroxypropylcellulose is used for the polysaccharide derivative in these examples because it is considered to be the best choice for such, the present invention is not limited in any manner by these examples.

EXAMPLE 1

An isotropic aqueous solution that is colorless and transparent at 20° C. was prepared composed of 100 parts by weight of hydroxypropylcellulose (hydroxypropyl groups: 62.4%, viscosity of 2% aqueous solution: 8.5 cps, average molecular weight: roughly 60,000), 20 parts by weight of polyoxypropylene-2-ethyl-2-hydroxymethyl-1,3-propanediol (average molecular weight: 400), 6 parts by weight of sodium chloride and 200 parts by weight of pure water. This isotropic aqueous solution was provided at a thickness of 0.2 mm between 6 cm squares of soda lime glass having a thickness of 3 mm, and sealed to form a laminated body. This laminated body demonstrated favorable results in repeated reversal testing at room temperature and 60° C. as well as in standing stability testing at 60° for 48 hours without the occurrence of phase separation. In addition, when the laminated body was placed at distance of 15 mm from a plate containing a black and white stripe pattern at a pitch of 2 mm between stripes in a constant temperature bath, and visually observed while irradiating from above with a light, clouding began at 34° C., and strong clouding resulting in blockage of light occurred at 40° C., thus making it impossible to see through the laminated body at all. In addition, when the laminated body was frozen by allowing to stand at $-20°$ C., the unevenness in the borderlines that formed at that time disappeared as the ice melted and did not remain.

Moreover, assuming use as an automobile window, the laminated body was allowed to stand for 6 hours at 100° C. In this case as well, there was no occurrence of phase separation, and the laminated body completely returned to its initial state when the temperature lowered.

EXAMPLE 2

An isotropic aqueous solution that is colorless and transparent at 20° C. was prepared using polypropylene glycol (average molecular weight: 400) instead of the polyoxypropylene-2-ethyl-2-hydroxymethyl-1,3-propanediol used in Example 1. A laminated body was fabricated in the same manner as Example 1, and evaluation of its stability and clouding change revealed them to be favorable without occurrence of phase separation. In addition, clouding began at 36° C., and strong clouding resulting in blockage of light was observed at roughly 43° C., thus making it impossible to see through the laminated body at all.

EXAMPLE 3

An isotropic aqueous solution that is colorless and transparent at 20° C. was prepared using diethylene glycol monobutyl ether (average molecular weight: 162) instead of the polyoxypropylene-2-ethyl-2-hydroxymethyl-1,3-propanediol used in Example 1. A laminated body was fabricated in the same manner as Example 1, and evaluation of its stability and clouding change revealed them to be favorable without occurrence of phase separation. In addition, clouding began at 34° C., and strong clouding resulting in blockage of light was observed at 40° C., thus making it impossible to see through the laminated body at all.

EXAMPLE 4

An isotropic aqueous solution that is colorless and transparent at 20° C. was prepared using dipropylene glycol monomethyl ether (average molecular weight: 148) instead of the polyoxypropylene-2-ethyl-2-hydroxymethyl-1,3-propanediol used in Example 1. A laminated body was fabricated in the same manner as Example 1, and evaluation of its stability and clouding change revealed them to be favorable without occurrence of phase separation. In addition, clouding began at 36° C., and strong clouding resulting in blockage of light was observed at 43° C., thus making it impossible to see through the laminated body at all.

EXAMPLE 5

An isotropic aqueous solution that is colorless and transparent at 20° C. was prepared using polyoxypropylene glycerine (average molecular weight: 600) instead of the polyoxypropylene-2-ethyl-2-hydroxymethyl-1,3-propanediol used in Example 1. A laminated body was fabricated in the same manner as Example 1, and evaluation of its stability and clouding change revealed the to be favorable without occurrence of phase separation. In addition, clouding began at 37° C., and strong clouding resulting in blockage of light was observed at 44° C., thus making it impossible to see through the laminated body at all.

EXAMPLE 6

An isotropic aqueous solution that is colorless and transparent at 20° C. was prepared using sodium laurylsulfate instead of the polyoxypropylene-2-ethyl-2-hydroxymethyl-1,3-propanediol used in Example 1. A laminated body was fabricated in the same manner as Example 1, and evaluation of its stability and clouding change revealed them to be favorable without occurrence of phase separation. In addition, clouding began at 32° C., and strong clouding resulting in blockage of light was observed at 41° C., thus making it impossible to see through the laminated body at all.

EXAMPLE 7

An isotropic aqueous solution that is colorless and transparent at 20° C. was prepared composed of 100 parts by weight of the same hydroxypropylcellulose used in Example 1, 20 parts by weight of a mixture of poly(oxyethyleneoxypropylene)glycol and monobutyl ether polyoxypropylene glycerine (average molecular weight: 2300) at a weight ratio of 50:50, and 200 parts of pure water. A laminated body was fabricated in the same manner as Example 1, and evaluation of its stability and clouding change revealed them to be favorable without occurrence of phase separation. In addition, clouding began at 47° C., and strong clouding resulting in blockage of light was observed at 57° C., thus making it impossible to see through the laminated body at all.

EXAMPLE 8

Four types of isotropic aqueous solutions that are colorless and transparent at 20° C. were prepared in the same manner as Example 1 respectively using water-based medium (A), composed of polyoxypropylene-2-ethyl-2-hydroxymethyl-1,3-propanediol and pure water (2 parts by weight/200 parts by weight), water-based medium (B), composed of polyoxypropylene-2-ethyl-2-hydroxymethyl-1,3-propanediol and pure water (5 parts by weight/200 parts by weight), water-based medium (C), composed of polyoxypropylene-2-ethyl-2-hydroxymethyl-1,3-propanediol and pure water (200 parts by weight/200 parts by weight), and water-based medium (D) composed of polyoxypropylene-2-ethyl-2-hydroxymethyl-1,3-propanediol and pure water (20 parts by weight/300 parts by weight) with respect to 100 parts by weight of the hydroxypropylcellulose of Example 1 in order to observe the changes that occur depending on the amount of amphipathic substance added. Next, laminated bodies were fabricated in the same manner as Example 1 using these aqueous solutions and their stability and clouding change were evaluated. Phase separation was observed for (A). However, in the case of (B), phase separation was not observed and properties were favorable. Clouding began at 47° C., and strong clouding resulting in blockage of light was observed at 53° C., thus making it impossible to see through the laminated body at all. In the case of (C) as well, phase separation was not observed and properties were favorable. Clouding began at 43° C., and strong clouding resulting in blockage of light was observed at 48° C., thus making it impossible to see through the laminated body at all. Moreover, (D) was also observed to be free of the occurrence of phase separation and demonstrate favorable properties. Clouding began at 49° C., and strong clouding resulting in blockage of light was observed at 55° C., thus making it impossible to see through the laminated body at all.

EXAMPLE 9

Isotropic aqueous solutions were prepared while changing the amount of sodium chloride added in Example 1 to 0 parts by weight, 2 parts by weight and 10 parts by weight, respectively. Laminated bodies were prepared in the same manner as Example 1, and their stability and clouding change were evaluated. In the case of an added amount of 10 parts by weight, the solution demonstrated strong aggregation and phase separation. However, in the other cases, phase separation was not observed and properties were favorable. In the case of an added amount of 0 parts by weight, clouding began at 49° C., and strong clouding resulting in blockage of light was observed at 55° C., thus making it impossible to see through the laminated body at all. When 2 parts by weight were added, clouding began at 44° C., and strong clouding resulting in blockage of light was observed at 50° C., thus making it impossible to see through the laminated body at all. Based on these results, it was found that increasing the amount of sodium chloride added causes the temperature at which clouding begins to shift downward to a lower temperature.

EXAMPLE 10

Isotropic aqueous solutions were prepared in the same manner as Example 1 respectively using water-based medium (A), composed of polyoxypropylene-2-ethyl-2-hydroxymethyl-1,3-propanediol, sodium chloride and pure water (20 parts by weight/3 parts by weight/100 parts by weight), water-based medium (B), composed of polyoxypropylene-2-ethyl-2-hydroxymethyl-1,3-propanediol, sodium chloride and pure water (50 parts by weight/3 parts by weight/100 parts by weight), water-based medium (C), composed of polyoxypropylene-2-ethyl-2-hydroxymethyl-1,3-propanediol, sodium chloride and pure water (200 parts by weight/2.4 parts by weight/80 parts by weight), and water-based medium (D) composed of polyoxypropylene-2-ethyl-2-hydroxymethyl-1,3-propanediol, sodium chloride and pure water (200 parts by weight/1.5 parts by weight/50 parts by weight) with respect to 100 parts by weight of the hydroxypropylcellulose of Example 1. Next, laminated bodies were fabricated in the same manner as Example 1 using these aqueous solutions and their stability and clouding change were evaluated. In the case of (A), although phase separation did not occur and the laminated body was colorless, it exhibited a pale white color at 15° C., and strong clouding resulting blockage of light was observed at 40° C. In the case of (B), the laminated body was colorless, phase separation was not observed and properties were favorable. Clouding began at 32° C., and strong clouding resulting in blockage of light was observed at 38° C., thus making it impossible to see through the laminated body at all. In the case of (C), the laminated body was colorless, phase separation was not observed and properties were favorable. Clouding began at 23° C., and strong clouding resulting in blockage of light was observed at 36° C., thus making it impossible to see through the laminated body at all. In addition, in the case of (D), the laminated body was colorless, phase separation was not observed, and properties were favorable. Clouding began at 31° C., and then changed gradually until strong clouding resulting in blockage of light was observed at 73° C. which made it impossible to see through the laminated body at all. Thus, although a colorless and transparent isotropic aqueous solution is obtained when the amount of amphipathic substance added is increased, this finding indicates that amphipathic substances have solvent action. In addition, since cohesive force is weakened as molecular weight becomes relatively smaller, it is necessary to apply a higher temperature than the temperature at which clouding begins in order to achieve strong clouding that blocks out light. This can be further understood by comparing with Example 1 (wherein the difference in temperature between the temperature at which clouding began and the temperature at which strong clouding occurred was 6° C.).

EXAMPLE 11

Isotropic aqueous solutions were additionally prepared in the same manner as Example 1 respectively using water-based medium (A), composed of polyoxypropylene-2-ethyl-2-hydroxymethyl-1,3-propanediol, sodium chloride and pure water (200 parts by weight/1.5 parts by weight/30 parts by weight), water-based medium (B), composed of polyoxypropylene-2-ethyl-2-hydroxymethyl-1,3-propanediol, sodium chloride and pure water (1,200 parts by weight/12 parts by weight/400 parts by weight), water-based medium (C), composed of polyoxypropylene-2-ethyl-2-hydroxymethyl-1,3-propanediol, sodium chloride and pure water (800 parts by weight/5 parts by weight/100 parts by weight), water-based medium (D) composed of polyoxypropylene-2-ethyl-2-hydroxymethyl-1,3-propanediol, sodium chloride and pure water (1,500 parts by weight/9 parts by weight/300 parts by weight), water-based medium (E), composed of polyoxypropylene-2-ethyl-2-hydroxymethyl-1,3-propanediol, sodium chloride and pure water (800 parts by weight/6 parts by weight/300 parts by weight), water-based medium (F), composed of polyoxypropylene-2-ethyl-2-hydroxymethyl-1,3-propanediol, sodium chloride and pure water (800 parts by weight/9 parts by weight/300 parts by weight), water-based medium (G), composed of polyoxypropylene-2-ethyl-2-hydroxymethyl-1,3-propanediol, sodium chloride and pure water (200 parts by weight/2.25 parts by weight/75 parts by weight), water-based medium (H) composed of polyoxypropylene-2-ethyl-2-hydroxymethyl-1,3-propanediol, sodium chloride and pure water (200 parts by weight/2 parts by weight/100 parts by weight), water-based medium (I), composed of polyoxypropylene-2-ethyl-2-hydroxymethyl-1,3-propanediol, sodium chloride and pure water (300 parts by weight/2 parts by weight/100 parts by weight), and water-based medium (J) composed of polyoxypropylene-2-ethyl-2-hydroxymethyl-1,3-propanediol, sodium chloride and pure water (300 parts by weight/3 parts by weight/100 parts by weight), with respect to 100 parts by weight of hydroxypropylcellulose (hydroxypropyl groups: 62.6%, viscosity of 2% aqueous solution: 5.4 cps, average molecular weight: roughly 40,000). Moreover, laminated bodies were fabricated in the same manner as Example 1 using these aqueous solutions and their stability and clouding change were evaluated. In the case of (A), although the laminated body was colorless and transparent at room temperature, clouding change began at a high temperature of 65° C. The increase in light blocking was small even when the temperature was further raised to 80° C., and did not result in strong clouding that completely blocked out light. In the case of (B), clouding began at 7° C., and strong clouding resulting in blockage of light was observed at 27° C., thus making it impossible to see through the laminated body at all. In the case of (C), clouding began at 41° C., and although light blockage increased as the temperature was raised, strong clouding that completely blocked out light did not occur even at 80° C. In the case of (D), clouding began at 16° C., and strong clouding resulting in blockage of light was observed at 53° C. which made it impossible to see through the laminated body at all. In the case of (E), clouding began at 20° C., and strong clouding resulting in blockage of light was observed at 36° C., thus making it impossible to see through the laminated body at all. In the case of (F), clouding began at 5° C., and strong clouding resulting in blockage of light was observed at 29° C., thus making it impossible to see through the laminated body at all. In the case of (G), clouding began at 24° C., and strong clouding resulting in blockage of light was observed at 47° C., thus making it impossible to see through the laminated body at all. In the case of (H), clouding began at 31° C., and strong clouding resulting in blockage of light was observed at 48° C., thus making it impossible to see through the laminated body at all. In the case of (I), clouding began at 29° C., and strong clouding resulting in blockage of light was observed at 60° C., thus making it impossible to see through the laminated body at all. In the case of (J), clouding began at 25° C., and strong clouding resulting in blockage of light was observed at 40° C. which made it impossible to see through the laminated body at all.

As described above, it was found that the temperature at which clouding began was able to be set as desired by changing the composition of the water-based medium and the concentration of polysaccharide derivative. In addition, it was also found by comparison with Example 1 that the rate of clouding change with respect to change in temperature becomes smaller as the ratio of amphipathic substance becomes relatively large. In addition, the isotropic aqueous solution was colorless in all laminated bodies, phase separation did not occur, properties were favorable, and it did not freeze even when the temperature was lowered to −20° C.

EXAMPLE 12

Isotropic aqueous solutions were prepared in the same manner as Example 1 respectively using water-based medium (A), composed of polyoxypropylene-2-ethyl-2-hydroxymethyl-1,3-propanediol, sec-butyl alcohol and pure water (10 parts by weight/50 parts by weight/200 parts by weight), water-based medium (B), composed of polyoxypropylene-2-ethyl-2-hydroxymethyl-1,3-propanediol, sec-butyl alcohol and pure water (20 parts by weight/100 parts by weight/100 parts by weight), water-based medium (C), composed of polyoxypropylene-2-ethyl-2-hydroxymethyl-1,3-propanediol, sec-butyl alcohol, sodium chloride and pure water (20 parts by weight/4 parts by weight/4.8 parts by weight/160 parts by weight), and water-based medium (D) composed of polyoxypropylene-2-ethyl-2-hydroxymethyl-1,3-propanediol, sec-butyl alcohol, sodium chloride and pure water (20 parts by weight/150 parts by weight/1.5 parts by weight/50 parts by weight) with respect to 100 parts by weight of the hydroxypropylcellulose of Example 11. Next, laminated bodies were fabricated in the same manner as Example 1 using these aqueous solutions and their stability and clouding change were evaluated. In the case of (A), clouding began at 31° C., and strong clouding resulting in blockage of light was observed at 36° C., thus making it impossible to see through the laminated body at all. In the case of (B), clouding began at 37° C., and strong clouding resulting in blockage of light was observed at 51° C., thus making it impossible to see through the laminated body at all. In the case of (C), clouding began at 31° C., and strong clouding resulting in blockage of light was observed at 36° C., thus making it impossible to see through the laminated body at all. In addition, in the case of (D), clouding began at 6° C., and strong clouding resulting in blockage of light was observed at 56° C., thus making it impossible to see through the laminated body at all. In addition, the isotropic aqueous solution was colorless, there was no occurrence of phase separation, properties were favorable, and it did not freeze even at a temperature of −20° C. in all cases.

EXAMPLE 13

Isotropic aqueous solutions were prepared in the same manner as Example 1 respectively using water-based medium (A), composed of Amizet 5C manufactured by Kawaken Fine Chemical Co., Ltd. and pure water (20 parts by weight/200 parts by weight), water-based medium (B), composed of Amizet S3L manufactured by Kawaken Fine Chemical Co., Ltd., sodium chloride and pure water (20 parts by weight/4.8 parts by weight/160 parts by weight), and water-based medium (C), composed of Softazoline CPB-R manufactured by Kawaken Fine Chemical Co., Ltd., sodium chloride and pure water (20 parts by weight/4.8 parts by weight/160 parts by weight) and polyoxypropylene-2-ethyl-2-hydroxymethyl-1,3-propanediol, sec-butyl alcohol, sodium chloride and pure water (20 parts by weight/4 parts by weight/4.8 parts by weight/160 parts by weight), with respect to 100 parts by weight of the hydroxypropylcellulose of Example 11. Next, laminated bodies were fabricated in the same manner as Example 1 using these aqueous solutions and their stability and clouding change were evaluated. In the case of (A), clouding began at 37° C., and strong clouding resulting in blockage of light was observed at 48° C., thus making it impossible to see through the laminated body at all. In the case of (B), clouding began at 31° C., and strong clouding resulting in blockage of light was observed at 38° C., thus making it impossible to see through the laminated body at all. In the case of (C), clouding began at 35° C., and strong clouding resulting in blockage of light was observed at 43° C., thus making it impossible to see through the laminated body at all. In addition, the isotropic aqueous solution was colorless, there was no occurrence of phase separation and properties were favorable in all cases.

EXAMPLE 14

An isotropic aqueous solution was prepared composed of 100 parts by weight of the same hydroxypropylcellulose used in Example 1, 20 parts by weight of polyoxypropylene-2-ethyl-2-hydroxymethyl-1,3-propanediol, 50 parts by weight of propylene glycol, 10 parts by weight of sodium chloride and 200 parts by weight of pure water. A laminated body was fabricated in the same manner as Example 1 using this aqueous solution, and its stability and clouding change were evaluated. There was no occurrence of phase separation and properties were favorable. In addition, clouding began at 33° C., and strong clouding resulting in blockage of light was observed at 38° C., thus making it impossible to see through the laminated body at all. This laminated body is suitable for use in automobiles because the aqueous solution does not freeze even at −20° C.

EXAMPLE 15

Two types of isotropic aqueous solutions that are colorless and transparent at 20° C. were prepared in the same manner as Example 1 respectively using hydroxypropylcellulose (A) (hydroxypropyl groups: 61.6%, viscosity of 2% aqueous solution: 2.5 cps, average molecular weight: roughly 20,000), and hydroxypropylcellulose (B) (hydroxypropyl groups: 62.6%, viscosity of 2% aqueous solution: 5.4 cps, average molecular weight: roughly 40,000) instead of the hydroxypropylcellulose of Example 1. Moreover, laminated bodies were fabricated in the same manner as Example 1 using these aqueous solutions and their stability and clouding change were evaluated. In the case of (A), phase separation was not observed and properties were favorable. Clouding began at 40° C., and strong clouding resulting in blockage of light was observed at 46° C., thus making it impossible to see through the laminated body at all. In the case of (B), phase separation was not observed and properties were favorable. Clouding began at 38° C., and strong clouding resulting in blockage of light was observed at 44° C., thus making it impossible to see through the laminated body at all. In addition, it was found that light blockage is weakened as molecular weight becomes smaller, and that phase separation of water occurs if molecular weight is excessively large.

EXAMPLE 16

Two types of isotropic aqueous solutions were prepared as comparative examples consisting of an isotropic aqueous solution not containing the polyoxypropylene-2-ethyl-2-hydroxymethyl-1,3-propanediol used as the amphipathic substance in Example 1, and one not containing sodium chloride. Laminated bodies were fabricated in the same manner as Example 1 and their stability and clouding change were evaluated. In both cases, phase separation of water occurred and a reversible change was unable to be attained. Separation due to precipitation occurred when the laminated bodies were placed upright. Thus, it was found that the presence of amphipathic substance is extremely important for reversing stability.

EXAMPLE 17

The aqueous solution of Example 1 made to be free of air bubbles was applied to a thickness of 1 mm with an applicator onto a soda lime glass substrate plate measuring 30 cm on a side and having a thickness of 3 mm. After cooling this substrate plate to 0° C. (water vapor pressure: roughly 4.6 mmHg) and reducing pressure to 8 mmHg, another substrate plate of equal size, having tiny water droplets uniformly adhered by dew condensation, was brought in contact with the initial substrate plate from above, and gradually brought in contact over its entire surface. After adhering the two substrate plates over their entire surface, pressure was returned to normal pressure and the outer edges were washed. Next, after wrapping 25 mm wide aluminum tape coated with sealant (containing 100 parts by weight of Flep 60 manufactured by Toray-Thiocoll as its main ingredient along with 28 parts by weight of Dytocral X-2392 as curing agent) around the outer edges of the laminated body, the laminated body was sealed by curing at room temperature. Furthermore, the reduction of pressure and formation of tiny water droplets enabled lamination to be performed while eliminating air bubbles more reliably in comparison with simply using substrate plates in lamination.

EXAMPLE 18

A uniform aqueous solution was prepared by adding 500 parts by weight of a 1% by weight aqueous solution of sodium chloride to 100 parts by weight of the hydroxypropylcellulose of Example 1, and mixing well by stirring. Two liters of this aqueous solution were transferred to a container having an inner diameter of 10 cm and the temperature was raised to 70° C. After forming a low viscosity aqueous solution in which the hydroxypropylcellulose was uniformly clouded and dispersed by stirring well in a state in which it had precipitated roughly 3 mm from the liquid surface, pressure was reduced to remove air bubbles. Next, after allowing to stand for 12 hours in an atmosphere at 70° C., the solution separated into a cloudy aggregate layer and a supernatant layer following precipitation. This supernatant was removed and the temperature was returned to room temperature to obtain a high concentration aqueous solution free of air bubbles. This high concentration aqueous solution and a 50% by weight aqueous solution of polypropylene glycol (average molecular weight: 400) were uniformly mixed at a weight ratio of 1:1 with a static mixer equipped with 24 elements to obtain an isotropic aqueous solution free of air bubbles. Next, this isotropic aqueous solution was treated in the same manner as Example 17 to obtain a favorable laminated body.

EXAMPLE 19

A low viscosity aqueous solution was obtained by additionally adding 200 parts by weight of pure water to the same aqueous solution as that obtained in Example 1. After applying this aqueous solution with an applicator to a soda lime glass substrate plate measuring 30 cm on a side and having a thickness of 6 mm, the surface of which was coated with silica to minimize elution of sodium, the substrate plate was dried after sprinkling with plastic beads having a diameter of 0.3 mm to coat the substrate plate with a solid film having a thickness of 0.1 mm. The coated substrate plate was immersed in pure water at 80° C. for which the air had been replaced with nitrogen. Moreover, the opposing substrate plate, in the form of an identical glass substrate plate, was laminated by allowing to stand at room temperature after removing the water while applying lamination pressure. After temporarily sealing the outer edges of this laminated body with copper tape coated with adhesive, the outer edges were thoroughly washed. Next, U-shaped aluminum frames provided with the same sealant as used in Example 16 were fastened to the outer edges to seal the laminated body. Next, this was allowed to stand to obtain a colorless, transparent laminated body free of hazing and air bubbles.

EXAMPLE 20

A soda lime glass substrate plate measuring 30 cm on a side and having a thickness of 6 mm, provided with a solid film of the same hydroxypropylcellulose used in Example 1 cut to a width of 10 mm between its outer edges and having a width of 0.1 mm, was laminated with another substrate plate of the same size by means of the same sealant used in Example 12 using thin plate glass spacers at a width of 10 mm and having a thickness of 0.3 mm. The sealant was cured by heating at 120° C. with the two ends of diagonal corners opened in the form of injection holes. Next, one of the ends was immersed in the same water-based medium used in Example 1 following degassing under reduced pressure, and the inside of the laminated body was filled by sucking in water-based medium from the other end. The laminated body was then sealed at room temperature by using corner caps after sealing with the same sealant used in Example 16. Next, this was allowed to stand to obtain a colorless, transparent laminated body free of hazing and air bubbles.

EXAMPLE 21

An aqueous solution composed of 100 parts by weight of the same hydroxypropylcellulose used in Example 1, 10 parts by weight of dipropylene glycol monomethyl ether (molecular weight: 148) and 500 parts by weight of pure water was cast to fabricate a film having a thickness of 0.1 mm. Dipropylene glycol monomethyl ether was dropped onto a soda lime glass substrate plate measuring 30 cm on a side and having a thickness of 3 mm, after which a film of the same size as the substrate plate was adhered on top of this liquid with a roller. Next, the substrate plate provided with the film was immersed in an aqueous solution at 70° C. composed of 3 parts by weight of sodium chloride and 100 parts by weight of pure water. After laminating with a substrate plate of the same size with spacers having a diameter of 0.2 mm placed in between while still immersed in the aqueous solution, the laminated body was taken out of the aqueous solution and allowed to stand at room temperature after sealing. As a result, a favorable laminated body was obtained that was free of air bubbles.

INDUSTRIAL APPLICABILITY

The present invention provides a laminated body containing an aqueous solution, this aqueous solution being an isotropic aqueous solution, wherein polysaccharide derivative dissolved in the aqueous solution aggregates to bring about clouding and scattering as a result of a rise in temperature, that is able to stably maintain a uniform state even when clouded, and is able to stably cause a reversible change between an opaque and transparent state. Since this laminated body automatically responds to changes in the environment, in the case of applying to a window, when the window becomes heated by the direct rays of the sun, the irradiated portion selectively changes from a transparent state to an opaque state, thereby resulting in blocking of direct light.

I claim:

1. A self-responding laminated body in which an isotropic solution, wherein a polysaccharide derivative, dissolved in water, aggregates to demonstrate cloudy scattering due to a rise in temperature resulting in a decrease in optical transmittance, is sealed in a cell, of which at least a portion is transparent, that enables said aqueous solution to be viewed directly; wherein, said isotropic aqueous solution is a solution in which 100 parts by weight of a polysaccharide derivative, having a weight average molecular weight of about 10,000 to 200,000, is dissolved in about 110 to 2,000 parts by weight of a water-based medium composed of an amount of water that is about 25 to 450 parts by weight with respect to 100 parts by weight of said polysaccharide derivative, and an amphipathic substance having a hydroxyl group, an ether bonded portion or an ionic group.

2. The laminated body as set forth in claim 1 wherein the polysaccharide derivative is a cellulose derivative.

3. The laminated body as set forth in either of claims 1 or 2 wherein the polysaccharide derivative at least has a hydroxypropyl group.

4. The laminated body as set forth in any of claims 1 through 2 wherein the polysaccharide derivative is hydroxypropylcellulose.

5. The laminated body as set forth in any of claims 1 through 2 wherein the amount of water is about 50 to 300 parts by weight with respect to 100 parts by weight of the polysaccharide derivative.

6. The laminated body as set forth in any of claims 1 through 2 wherein the amphipathic substance has a molecular weight of about 140 to 3,000.

7. The laminated body as set forth in any of claims 1 through 2 wherein the amount of amphipathic substance is about 0.5 to 800 parts by weight with respect to 100 parts by weight of water.

8. The laminated body as set forth in any of claims 1 through 2 wherein the isotropic aqueous solution additionally contains at least one type selected from the group consisting of electrolytes and lower alcohols.

9. The laminated body as set forth in any of claims 1 through 2 wherein the air dissolved in the isotropic aqueous solution is replaced with an inert gas.

10. The laminated body as set forth in any of claims 1 through 2 wherein the thickness of the layer of the isotropic aqueous solution differs over the laminated body.

11. The laminated body as set forth in any of claims 1 through 2 wherein two or more types of isotropic aqueous solutions, or an isotropic aqueous solution and an ordinary water-soluble polymer solution, are laminated.

12. The laminated body as set forth in any of claims 1 through 2 wherein a heating device is provided that is able to at least partially heat the laminated body.

13. The laminated body as set forth in any of claims 1 through 2 wherein a frame is provided around the outer periphery of the laminated body.

14. The laminated body as set forth in any of claims 1 through 2 wherein the outer periphery of the laminated body is sealed in two stages, and a region composed of saturated water vapor and/or water is provided between the first sealing portion and the second sealing portion.

15. A process for producing a self-responding laminated body that includes sealing an isotropic aqueous solution, composed by dissolving 100 parts by weight of a 30 polysaccharide derivative, having a weight average molecular weight of roughly 10,000 to roughly 200,000, in roughly 110 to roughly 2,000 parts by weight of a water-based medium composed of an amount of water that is roughly 25 to roughly 450 parts by weight with respect to 100 parts by weight of said polysaccharide derivative, and an amphipathic substance having a hydroxyl group, an ether bonded portion or an ionic group, in a cell, of which at least a portion is transparent, that enables said aqueous solution to be viewed directly.

16. The process as set forth in claim 15 wherein said isotropic aqueous solution is applied to a substrate plate that composes said cell, after which an opposing substrate plate is laminated and sealed.

17. The process as set forth in claim 16 wherein said isotropic aqueous solution is produced by mixing a high concentration aqueous solution of a polysaccharide derivative, obtained as a result of aggregation and precipitation by heating a low concentration aqueous solution, with a low viscosity medium.

18. The process as set forth in claim 15 wherein said isotropic aqueous solution is injected into a hollow body that composes said cell, followed by sealing.

19. The process as set forth in claim 15 that includes dispersing 100 parts by weight of said isotropic aqueous solution and about 110 to 2,000 parts by weight of said water-based medium between laminated substrate plates that compose said cell, and dissolving to form an isotropic aqueous solution layer, followed by sealing.

20. The process as set forth in claim 19 wherein the water-based medium is degassed in advance, and then dispersed between substrate plates.

21. The process as set forth in claim 15 that includes dispersing 100 parts by weight of said polysaccharide derivative and about 110 to 2,000 parts by weight of said water-based medium in a hollow body that composes said cell, and dissolving to form an isotropic aqueous solution layer, followed by sealing.

22. A window that uses a self-responding laminated body wherein an isotropic aqueous solution, in which a polysaccharide derivative, dissolved in water, aggregates to demonstrate cloudy scattering due to a rise in temperature resulting in a decrease in optical transmittance, is sealed in a cell, of which at least a portion is transparent, that enables said aqueous solution to be viewed directly; wherein, said isotropic aqueous solution is a solution in which 100 parts by weight of a polysaccharide derivative, having a weight average molecular weight of about 10,000 to 200,000, is dissolved in roughly 110 to roughly 2,000 parts by weight of a water-based medium composed of an amount of water that is roughly 25 to roughly 450 parts by weight with respect to 100 parts by weight of said polysaccharide derivative, and an amphipathic substance having a hydroxyl group, an ether bonded portion or an ionic group.

23. The window as set forth in claim 22 wherein the polysaccharide derivative is a cellulose derivative.

24. The window as set forth in either of claims 22 or 23 wherein the polysaccharide derivative at least has a hydroxypropyl group.

25. The window as set forth in any of claims 22 through 23 wherein the polysaccharide derivative is hydroxypropylcellulose.

26. The window as set forth in any of claims 22 through 23 wherein the amount of water is about 50 to 300 parts by weight with respect to 100 parts by weight of the polysaccharide derivative.

27. The window as set forth in any of claims 22 through 23 wherein the amphipathic substance has a molecular weight of about 140 to 3,000.

28. The window as set forth in any of claims 22 through 23 wherein the amount of amphipathic substance is about 0.5 to 800 parts by weight with respect to 100 parts by weight of water.

29. The window as set forth in any of claims 22 through 23 wherein the isotropic aqueous solution additionally contains at least one type selected from the group consisting of electrolytes and lower alcohols.

30. The window as set forth in any of claims 22 through 23 wherein the air dissolved in the isotropic aqueous solution is replaced with an inert gas.

31. The window as set forth in any of claims 22 through 23 wherein the thickness of the layer of the isotropic aqueous solution differs over the laminated body.

32. The window as set forth in any of claims 22 through 23 wherein two or more types of isotropic aqueous solutions, or an isotropic aqueous solution and an ordinary water-soluble polymer solution, are laminated.

33. The window as set forth in any of claims 22 through 23 wherein a heating device is provided that is able to at least partially heat the laminated body.

34. The window as set forth in any of claims 22 through 23 wherein a frame is provided around the outer periphery of the laminated body.

35. The window as set forth in any of claims 22 through 23 wherein the outer periphery of the laminated body is sealed in two stages, and a region composed of saturated water vapor and/or water is provided between the first sealing portion and the second sealing portion.

36. The window as set forth in any of claims 22 through 23 wherein at least one of the substrate plates is composed of ultraviolet absorbing glass, and this ultraviolet absorbing glass is facing towards the outside.

37. The window as set forth in any of claims 22 through 23 wherein at least one of the substrate glass plates is composed of heat absorbing glass.

38. The window as set forth in any of claims 22 through 23 wherein a gas layer is additionally provided on the self-responding laminated body.

39. The window as set forth in claim 38 wherein the temperature of the self-responding laminated body is controlled by circulating a cooling medium or heating medium in the gas layer.

40. The window as set forth in any of claims 22 through 23 wherein the self-responding laminated body is combined with a construction material sash or automobile frame to compose a unit.

* * * * *